(12) United States Patent
Ono et al.

(10) Patent No.: US 12,262,151 B2
(45) Date of Patent: Mar. 25, 2025

(54) POSITION INFORMATION PROVIDING SYSTEM

(71) Applicant: O&O LLC, Tokyo (JP)

(72) Inventors: Akihiro Ono, Tokyo (JP); Ayako Ono, Tokyo (JP); Hiroko Sugano, Tokyo (JP)

(73) Assignee: O&O LLC, Tokyo (JP)

( * ) Notice: Subject to any disclaimer, the term of this patent is extended or adjusted under 35 U.S.C. 154(b) by 0 days.

(21) Appl. No.: 18/712,099

(22) PCT Filed: Nov. 30, 2022

(86) PCT No.: PCT/JP2022/044242
§ 371 (c)(1),
(2) Date: May 21, 2024

(87) PCT Pub. No.: WO2023/106182
PCT Pub. Date: Jun. 15, 2023

(65) Prior Publication Data
US 2024/0333884 A1 Oct. 3, 2024

(30) Foreign Application Priority Data

Dec. 7, 2021 (WO) .................. PCT/JP2021/044908

(51) Int. Cl.
*H04N 7/18* (2006.01)
*G06Q 50/18* (2012.01)
(Continued)

(52) U.S. Cl.
CPC ........... *H04N 7/183* (2013.01); *G06Q 50/184* (2013.01); *G06V 20/52* (2022.01); *G06V 30/191* (2022.01)

(58) Field of Classification Search
None
See application file for complete search history.

(56) References Cited

U.S. PATENT DOCUMENTS

2017/0178060 A1  6/2017  Schwartz

FOREIGN PATENT DOCUMENTS

| CN | 112949396 A | 6/2021 |
| JP | 2015071495 A | 4/2015 |

(Continued)

OTHER PUBLICATIONS

International Search Report and Written Opinion issued in International Application No. PCT/JP2022/044242, mailed Jan. 17, 2023.

*Primary Examiner* — Christopher Braniff
(74) *Attorney, Agent, or Firm* — Amster, Rothstein & Ebenstein LLP

(57) ABSTRACT

A position information providing system includes: an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and a computer configured to generate information provision data based on the subject location information generated by the information device, wherein the information device has installed therein dedicated software for extracting, from a plurality of pieces of the acquired image data, image data including the subject identification information as required information worth information provision, and is configured to generate the subject location information for the image data extracted through use of the dedicated software, and to transmit the generated subject location information to the computer.

14 Claims, 9 Drawing Sheets

(51) Int. Cl.
*G06V 20/52* (2022.01)
*G06V 30/19* (2022.01)

(56) References Cited

FOREIGN PATENT DOCUMENTS

| JP | 2021149383 A | | 9/2021 |
|---|---|---|---|
| WO | WO2015034040 A1 | * | 3/2015 |
| WO | 2021106176 A1 | | 6/2021 |

* cited by examiner

| SUBJECT IDENTIFICATION INFORMATION | POSITION INFORMATION |
|---|---|
| MANUFACTURER: ○○ ELECTRIC<br>PRODUCT NAME: REFRIGERATOR<br>MODEL:     ABC-1000-XYZ | ○○-△△-□□,<br>KASUMIGASEKI,<br>CHIYODA-KU, TOKYO |

FIG. 2A

| SUBJECT IDENTIFICATION INFORMATION | POSITION INFORMATION |
|---|---|
| MANUFACTURER: ×× CORPORATION<br>PRODUCT NAME: MICROWAVE OVEN<br>MODEL:     AZ2021-ABC | ○○-CHOME,<br>□□-KU,<br>SAPPORO CITY,<br>HOKKAIDO |

FIG. 2B

| SUBJECT IDENTIFICATION INFORMATION | POSITION INFORMATION |
|---|---|
| MANUFACTURER: △△<br>PRODUCT NAME: ◎◎<br>DATE OF PRODUCTION: 2021-11-11 | ○○, ××-KU,<br>YOKOHAMA CITY,<br>KANAGAWA |

FIG. 2C

| NO. | KEYWORD 1 | KEYWORD 2 | KEYWORD 3 | POSITION INFORMATION |
|---|---|---|---|---|
| 1 | ○○ ELECTRIC | REFRIGERATOR | ABC-1000-XYZ | ○○-△△-□□, KASUMIGASEKI, CHIYODA-KU, TOKYO |
| 2 | ×× CORPORATION | MICROWAVE OVEN | AZ2021-ABC | ○○-CHOME, □□-KU, SAPPORO CITY, HOKKAIDO |
| 3 | △△ | ◎◎ | 2021-11-11 | ○○, ××-KU, YOKOHAMA CITY, KANAGAWA |
| 4 | | | | |

FIG. 3

POSITION INFORMATION PROVIDING SYSTEM

CROSS-REFERENCE TO RELATED APPLICATIONS

This application is a U.S. national stage entry under 35 U.S.C. § 371 of PCT International Patent Application No. PCT/JP2022/044242, filed Nov. 30, 2022, which claims the benefit of and priority to International Patent Application No. PCT/JP2021/044908, filed Dec. 7, 2021, the entire contents of each of which are incorporated herein by reference.

TECHNICAL FIELD

This disclosure relates to a position information providing system suitable to provision of information including position information on a photographing subject based on data collected through use of an information device.

BACKGROUND ART

Serious product accidents caused by recall target products tend to occupy about ten percent of all serious product accidents. When a serious product accident caused by a product to which measures for the recall have not been taken occurs, the Consumer Affairs Agency adds a special note relating to the recall to attract attention at the time of publication of this serious product accident.

However, there are many cases in which a collection rate of the recall target products remains low even when years have passed since the recall started. The recall having a low collection rate may include a case in which a publicizing activity has not been conducted due to insufficient funds or the like. Meanwhile, there is an example in which the collection rate does not increase even when the publicizing activity such as newspaper advertisements, TV commercials, and direct mail has been intensely conducted for a long period of time.

Thus, it is urgent to increase the recall collection rate in order to prevent the occurrence of the serious product accidents caused by the recall target products. As measures for increasing the recall collection rate, there exists a related art which uses the Internet of things (IoT) technology to ensure traceability of a product (for example, see Non-Patent Literature 1).

In Non-Patent Literature 1, there is shown one measure which uses the IoT technology to ensure the traceability of products already existing in the market. Specifically, in Non-Patent Literature 1, whether or not a product is a recall product is specified by using a portable terminal to capture a product image and applying image recognition that uses artificial intelligence (AI) to the captured product image. As a result, a recall product can easily be specified by simply using the portable terminal to capture the product image, and hence it is expected that this technology lead to the increase in collection rate.

CITATION LIST

Non Patent Literature

[NPL 1] "Toward improving recall efficiency," Mar. 19, 2018, the Ministry of Economy, Trade and Industry, Industrial safety group, Product Safety Division <URL: https://www.meti.go.jp/shingikai/shokeishin/seihin_anzen/pdf/015_02_00.pdf>

SUMMARY OF INVENTION

Technical Problem

However, the related art has the following problems.

In the related-art measure as disclosed in Non-Patent Literature 1, it is required to install application software for executing the image recognition that uses the AI to specify a model number in each portable terminal which captures the product image. Thus, users who can take this related-art measure are limited.

Further, the measure as disclosed in Non-Patent Literature 1 has such a point that, after a recall target product is specified, this recall product is specified by using the image recognition that uses the AI. Thus, as the number of products being the recall targets increases, it is required to newly develop recognition software for identifying the increased products, and then reinstall the developed recognition software in each portable terminal.

That is, the related-art technology according to Non-Patent Literature 1 is a technology which can be finally applied only when the development of the recognition software is completed after the product of the recall target is found. Thus, it is strongly desired to more quickly and effectively increase the collection rate of the recall product compared with the measure as disclosed in Non-Patent Literature 1.

Moreover, when a technology which can be applied to ensure traceability of not only the recall target product but also a product already existing in the market is established, this technology has a high utility value for a manufacturer. For example, this technology can also be used for information analysis such as analysis of which product is widely used in which region, and is not widely used in which region.

Further, when data which relates to not only the product but also a state or an attribute of a photographing subject captured by a camera and which is associated with position information can be collected and managed as big data, it is considered that this big data can be used for various applications. For example, when an area along a certain river is set as the photographing subject, and image data has been acquired at different positions, the image data can be used for information analysis such as analyzing a degree of rising water and a degree a flood in the river, and an area thereof as a result of influence of a typhoon or heavy rainfall.

Moreover, when a person to be searched for such as a wanted person, a suspect, a missing person, a loitering person, and a missing child is set as the photographing subject, and data on the person associated with position information can be collected and managed, this big data can be used to specify a position or an activity of the person to be searched for.

This disclosure has been made in order to solve the above-mentioned problem, and has an object to obtain a position information providing system suitable to provision of information including position information on a photographing subject.

Solution to Problem

According to one embodiment of this disclosure, there is provided a position information providing system including:

an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and a computer configured to generate information provision data based on the subject location information generated by the information device, wherein the information device has installed therein dedicated software for extracting, from a plurality of pieces of the acquired image data, image data including the subject identification information as required information worth information provision, and is configured to generate the subject location information for the image data extracted through use of the dedicated software, and to transmit the generated subject location information to the computer.

Further, according to one embodiment of this disclosure, there is provided a position information providing system including: an information device which is installed at a fixed position, and which includes a clock configured to provide time information and a camera, the information device being configured to extract person image data from image data acquired by the camera, and to generate person location information that associates position information relating to the fixed position, the person image data, and time information on a time of acquisition of the person image data with one another; and a computer configured to generate information provision data for specifying a person that has existed at the fixed position and a time of the existence based on the person location information generated by the information device, wherein the information device has installed therein dedicated software for extracting, from a plurality of pieces of the acquired image data, as the person image data, a specific person registered as required information worth information provision, and is configured to generate the person location information for the person image data extracted through use of the dedicated software, and to transmit the generated person location information to the computer.

Further, according to one embodiment of this disclosure, there is provided a position information providing system including: an information device which is installed at a fixed position of a specific moving body, and which includes a clock configured to provide time information and a camera, the information device being configured to extract, as person image data, a person that boards or exits from the specific moving body from image data acquired by the camera, and to generate person location information that associates position information indicating that the person has boarded or exited from the specific moving body, the person image data, and time information on a time of acquisition of the person image data with one another; and a computer configured to generate information provision data for specifying a person that has boarded or exited from the specific moving body and a boarding or exiting time based on the person location information generated by the information device, wherein the information device has installed therein dedicated software for extracting, from a plurality of pieces of the acquired image data, as the person image data, a specific person registered as required information worth information provision, and is configured to generate the person location information for the person image data extracted through use of the dedicated software, and to transmit the generated person location information to the computer.

Further, according to one embodiment of this disclosure, there is provided a position information providing system including: a first information device which is installed at a fixed position, and which includes a first clock configured to provide time information and a first camera, the first information device being configured to extract first person image data from image data acquired by the first camera, and to generate first person location information that associates first position information relating to the fixed position, the first person image data, and first time information on a time of acquisition of the first person image data with one another; and a second information device which is installed at a fixed position of a specific moving body, and which includes a second clock configured to provide time information and a second camera, the second information device being configured to extract, as second person image data, a person that boards or exits from the specific moving body from image data acquired by the second camera, and to generate second person location information that associates second position information indicating that the person has boarded or exited from the specific moving body, the second person image data, and second time information on a time of acquisition of the second person image data with one another, wherein the second information device has installed therein second dedicated software for extracting, from a plurality of pieces of the acquired image data, as the second person image data, a specific person registered as required information worth information provision, and is configured to generate the second person location information for the second person image data extracted through use of the second dedicated software, and to transmit the generated second person location information to the first information device, and wherein the first information device has installed therein first dedicated software installed therein for extracting, from a plurality of pieces of the acquired image data, as the first person image data, a specific person registered as required information worth information provision, and is configured to: generate the first person location information for the first person image data extracted through use of the first dedicated software; generate first information provision data for specifying a person that has existed at the fixed position and a time of the existence based on the first person location information, and generate second information provision data for specifying a person that has boarded or exited from the specific moving body and a boarding or exiting time based on the second person location information generated by the second information device; and summarize person location information on the same specific person as time elapses based on the first information provision data and the second information provision data, to thereby further generate third information provision data.

Advantageous Effects of Invention

According to this disclosure, the position information providing system suitable to the provision of information including the position information on the photographing subject can be obtained.

BRIEF DESCRIPTION OF DRAWINGS

FIG. 2 are explanatory tables for showing a specific example of subject location information associating subject identification information and position information with each other in the first embodiment of this disclosure.

FIG. 3 is an explanatory table for showing a specific example of a search data table associating keywords and the position information with each other in the first embodiment of this disclosure.

DESCRIPTION OF EMBODIMENTS

Preferred embodiments of a position information providing system according to this disclosure are now described with reference to the drawings. This disclosure has a technical feature in obtaining the position information providing system suitable to provision of information including position information on a photographing subject based on big data collected through use of information devices.

In the following first embodiment to third embodiment of this disclosure, description is mainly given of specific examples in a case in which the position information providing system according to this disclosure is applied to an increase in a collection rate of a recall product. That is, description is given of a case in which a product already existing in the market is a photographing subject, and information on the recall product is efficiently provided. Moreover, in a fourth embodiment of this disclosure, dedicated software suitable to the information provision in the first embodiment to the third embodiment is specifically described.

Moreover, in a fifth embodiment of this disclosure, description is mainly given of the position information providing system which uses an information device fixedly disposed in a facility and not having a GPS function, is specialized in, as a photographing subject, a person to be searched for such as a wanted person, a suspect, a missing person, a loitering person, and a missing child, and is suitable to collecting and providing person location information.

Moreover, in a sixth embodiment of this disclosure, as an application example of the information device without the GPS function, a specific example specialized in a case in which the information device is installed in a specific moving vehicle such as a school bus, a kindergarten bus, and a pickup vehicle for the elderly and the like for daycare is described.

Further, in a seventh embodiment of this disclosure, an application example being a combination of the fifth embodiment and the sixth embodiment is specifically described. Moreover, in the fifth embodiment to the seventh embodiment, the dedicated software suitable to the information provision in the fifth embodiment to the seventh embodiment is also specifically described.

As the information devices described in the fifth embodiment to the seventh embodiment, a security camera or a monitor camera disposed at a specific position may be included. That is, it is possible to implement functions of the information devices in the fifth embodiment to the seventh embodiment in the security camera and the monitor camera.

First Embodiment

Figure 1:
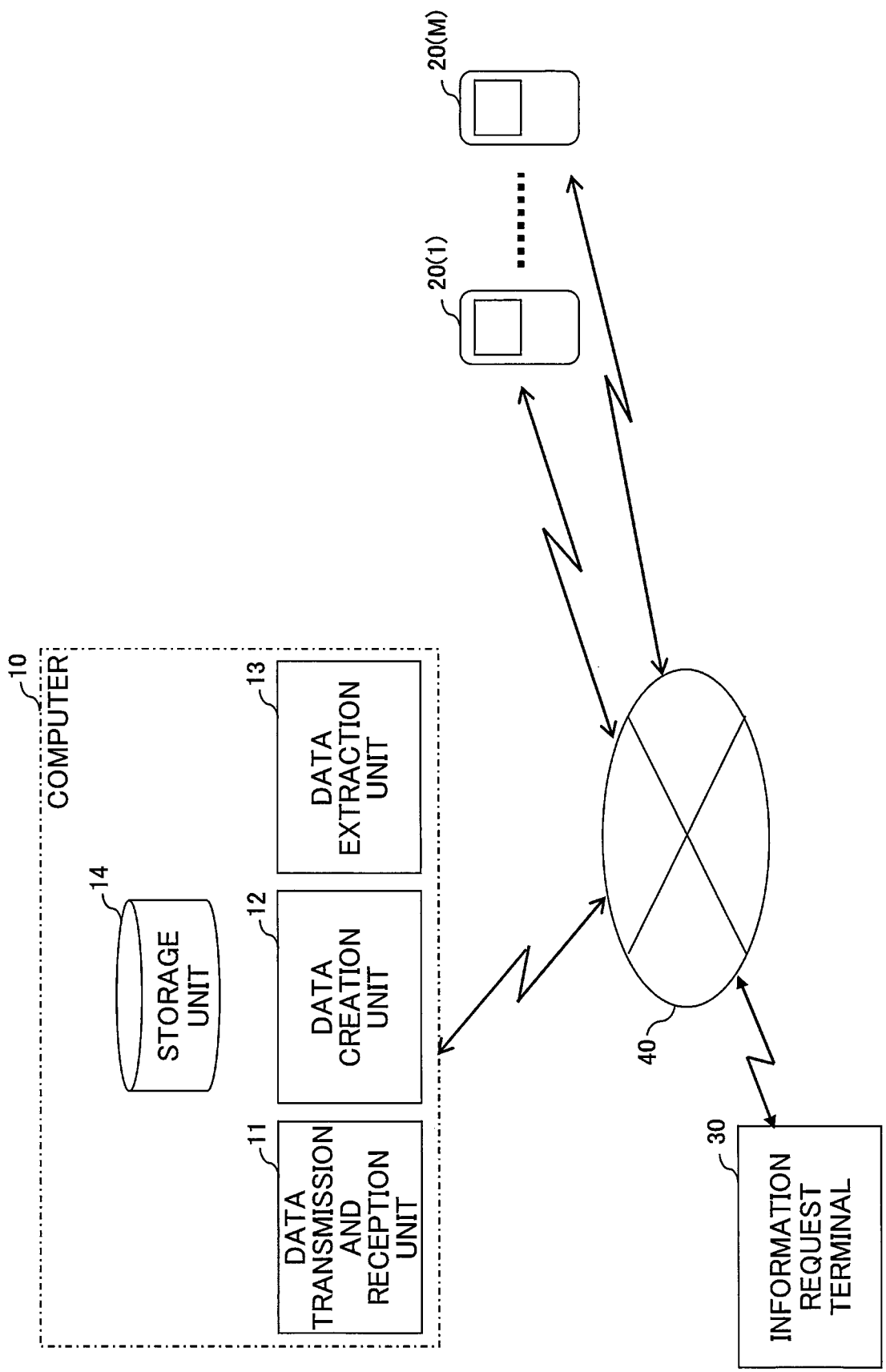
FIG. 1 is a diagram for illustrating an overall configuration of a position information providing system according to a first embodiment of this disclosure.

FIG. 1 is a diagram for illustrating an overall configuration of the position information providing system according to the first embodiment of this disclosure. The position information providing system according to the first embodiment is formed of a computer 10, M information devices 20(1) to 20(M), an information request terminal 30, and a network 40.

The number of information devices 20 is not limited to M, and is only required to be one or more. Moreover, the number of information request terminals 30 is not limited to one, and may be two or more. Moreover, mutual communication between the M information devices 20(1) to 20(M) and the information request terminal 30 may be any one of wireless communication or wired communication, and it is also possible to employ a configuration in which the mutual communication is not always executed via the network 40.

Each of the information devices 20(1) to 20(M) corresponds to, for example, a portable terminal or the like held by one of information providers. Each of the information devices 20(1) to 20(M) includes a GPS sensor which receives radio waves from global positioning system (GPS) satellites as GPS signals to detect a current position, and a camera which captures image data. Each of the M information devices is hereinafter simply described as "information device 20" when it is not required to distinguish the M information devices from one another.

The information provider can use the camera provided to the information device 20 to capture, as the image data, subject identification information attached to a product already existing in the market while the product is set as a photographing subject. The image data acquired by the camera provided to the information device 20 is not limited to a still image, but may be a moving image.

As the subject identification information, when the photographing subject is a product, information for identifying the product such as a manufacturer name, a product name, a model, and a serial number described on a nameplate attached to the product is given as an example. Moreover, in place of the nameplate, it is conceivable to use image data on a barcode, a QR code (trademark), or the like attached to a product to acquire the subject identification information through use of the information device 20.

Moreover, when a river, a dam, a seacoast, or the like is set as the photographing subject, information relating to the state of the photographing subject such as a water level and a flood corresponds to the subject identification information.

The information device 20 can specify the position information through use of the GPS sensor. That is, the image data captured by the information device 20 can be managed as data associated with the position information. The position information is not limited to two-dimensional data, and three-dimensional data including the height direction as well may also be used.

The information device 20 in the first embodiment creates subject location information which associates the subject identification information and the position information with each other, and transmits the subject location information to the computer 10. It is conceivable to install, in advance, dedicated software in the information device 20 as required in order to efficiently create and transmit the subject location information. The dedicated software is described in detail in the fourth embodiment described later.

Thus, the information provider holding the information device 20 can use the dedicated software to easily generate the subject location information associating the subject identification information acquired by the camera and the position information acquired by the GPS sensor with each other, and easily transmit, as big data, the generated subject location information to the computer 10 which summarizes the big data.

The computer 10 which summarizes the big data includes a data transmission and reception unit 11, a data creation unit 12, a data extraction unit 13, and a storage unit 14. In FIG. 1, the number of computers 10 is exemplified as one, but the computer 10 in this disclosure is not limited to the configuration of FIG. 1. For example, another configuration such as a redundant configuration including a backup or a configuration in which a plurality of computers are disposed in a distributed manner may also be employed as the computer 10.

The data transmission and reception unit 11 is capable of receiving the subject location information from each of the information devices 20(1) to 20(M) via the network 40. That is, the computer 10 is capable of easily collecting, as the big data, the subject location information relating to various products already existing in the market.

The subject location information collected by the computer 10 is not limited to the recall target product, and, as an example, all products already existing in the market may be set as the target. That is, the computer 10 is capable of collecting, as the big data from a large number of information devices 20, the subject location information associating the subject identification information and the position information with each other for various products already existing in the market irrespective of whether or not the products are the target of the recall.

FIG. 2 are explanatory tables for showing a specific example of the subject location information associating the subject identification information and the position information with each other in the first embodiment of this disclosure. In FIG. 2A and FIG. 2B, a case in which "manufacturer," "product name," and "model" are specified as items of the subject identification information from the image data acquired by the information device 20 is exemplified.

Moreover, in FIG. 2C, a case in which "manufacturer," "product name," and "date of production" are specified as items of the subject identification information from the image data acquired by the information device 20 is exemplified.

The processing of specifying each item of the subject identification information from the image data may be executed on the information device 20 side or may be executed on the computer 10 side. When this processing is executed on the computer 10 side, the information device 20 can transmit, as the subject identification information, the subject location information created through use of the image data to the computer 10.

In order to specify the subject identification information from character information included in the image data, character recognition processing is applied to the image data.

Moreover, the method of specifying the subject identification information from the image data is not limited to the case in which the character information is extracted by applying the character recognition processing to the image obtained by capturing the nameplate, to thereby specify the subject identification information. For example, the case in which the subject identification information is specified from an image obtained by capturing a barcode, a QR code, or the like is conceivable. In order to specify the subject identification information from the barcode or the QR code included in the image data, a function of a barcode reader or a QR code reader is used.

When the configuration in which the image data is used as the subject identification information and the image data itself is transmitted from the information device 20 to the computer 10 is employed, the subject identification information can be transmitted without the information device 20 side having a special additional function such as the character recognition processing, the barcode reader, or the QR code reader.

Moreover, even when the processing of specifying each item of the subject identification information from the image data is executed on the information device 20 side, it is also possible to employ a configuration in which information including the image data is transmitted as the subject identification information from the information device 20 to the computer 10 together with the processing result.

The data creation unit 12 specifies search keywords to be used for search processing at the time of information provision from the subject identification information included in various types of subject location information received by the data transmission and reception unit 11. Further, the data creation unit 12 generates, as search data, data associating the specified search keywords and the position information included in the subject location information with each other.

In the storage unit 14, a set of pieces of the search data associating the search keywords specified from the subject identification information and the position information with each other is stored as a search data table. Thus, the data creation unit 12 can use the created newest search data to update the search data table stored in the storage unit 14.

FIG. 3 is an explanatory table for showing a specific example of the search data table associating keywords and the position information with each other in the first embodiment of this disclosure. Data shown as "NO. 1" corresponds to search data associating three keywords extracted by the data creation unit 12 and the position information with each other based on the subject location information of FIG. 2A.

More specifically, the data creation unit 12 can extract, based on the subject location information of FIG. 2A, "∘∘ Electric" corresponding to the manufacturer as a keyword 1, extract "refrigerator" corresponding to the product name as a keyword 2, and extract "ABC-1000-XYZ" corresponding to the model as a keyword 3.

Similarly, data shown as "NO. 2" corresponds to search data obtained by associating three keywords extracted by the data creation unit 12 and the position information each other based on the subject location information of FIG. 2B. Moreover, data shown as "NO. 3" corresponds to search data obtained by associating three keywords extracted by the data creation unit 12 and the position information with each other based on the subject location information of FIG. 2C.

The number of keywords is not limited to three. Moreover, the number of keywords may be different from search data to search data. That is, it is only required that one piece of search data include one or more keywords and the position information associated with each other.

The data creation unit 12 generates the search data each time the subject location information is received, and updates the search data table formed of the set of pieces of search data stored in the storage unit 14.

When the image data is included in the subject location information received from the information device 20, the data creation unit 12 may generate each piece of search data in a form including the image data as required, and may store the generated search data as the search data table in the storage unit 14. When the image data is stored as the search data table, the image data may also be included in information provision data described later, and may then be provided to the information provision requester.

As a result of the creation of the search data table as shown in FIG. 3, extraction, sorting, and the like by a required keyword can easily be executed. That is, desired data can easily be extracted through use of a keyword required for information provision by using the search data table including various keywords and the position information associated with each other.

The information request terminal 30 corresponds to a terminal owned by, for example, a manufacturer of the recall target product. When an input person of the manufacturer has a product the locations of which is to be specified, the input person operates the information request terminal 30 to create, for example, input data having the product name and the model as the search keywords. Further, the input person of the manufacturer transmits, via the network 40, the input data created through use of the information request terminal 30 to the computer 10 holding the big data.

The data transmission and reception unit 11 receives the input data from the information request terminal 30 via the network 40. That is, the computer 10 can know that the information provision request for the search keywords relating to the product name and the model included in the input data has been made from the information request terminal 30 which desires the information provision.

When the data extraction unit 13 acquires, as the input data, the search keywords for designating the data to be extracted from the search data included in the search data table stored in the storage unit 14, the data extraction unit 13 extracts the search data including the search keywords from the search data table stored in the storage unit 14.

Further, the data extraction unit 13 generates, as the information provision data, a set of pieces of search data extracted in correspondence to the search keywords received by the data transmission and reception unit 11 based on an extraction result.

After that, the data transmission and reception unit 11 transmits the information provision data generated by the data extraction unit 13 to the information request terminal 30 being the transmission source of the input data via the network 40.

As a result, the input person of the manufacturer corresponding to an information provision requester can easily acquire the information provision relating to the locations of the products corresponding to the search words designated in the input data.

The search keywords set as the input data are not limited to the two words being the product name and the model, and may be set as only one word or as three or more words. The data extraction unit 13 can generate appropriate information provision data in response to the set search keywords, and can provide information to the information provision requester.

The service provider which provides the above-mentioned position information provision service can collect a service usage fee from the request source of the information provision in accordance with the content of the information provision. Further, the service provider may award, in exchange for the information provision, for example, points to the information provider who has provided the subject location information included in the information provision.

Specifically, when the subject location information is transmitted from the information device, the information provider adds provider information set to specify the provider to the subject location information to transmit the subject location information.

Meanwhile, when the data creation unit 12 acquires, for example, from the information device 20(*m*), the provider information together with the subject location information, the data creation unit 12 generates the search data as data further associating the provider information, and updates the search data table stored in the storage unit 14.

After that, when the information on the information provision data is provided to the input person of the input data, the data extraction unit 13 specifies the provider information associated with the subject location information which has contributed to the information provision, and awards information use points to the provider corresponding to the specified provider information.

Further, the data extraction unit 13 uses the specified provider information to notify the information provider that the information use points have been awarded. For example, when an address of the information device 20 being the transmission source of the subject location information which has contributed the information provision is set as the provider information, the data extraction unit 13 can transmit the notification of the awarding of the points to this information device 20.

As described above, as a result of introduction of the incentive system which awards the points to the source of the provision of the subject location information used for the information provision, it is expected that the provision of the subject location information be further promoted.

When the incentive system is to be introduced, the incentive system is not limited to a case of employing the awarding of points. For example, in place of the awarding of points, it is possible to employ another method such as awarding a coupon, a lottery prize, and the like through lottery, and payment of prize money to useful information provision.

Figure 4:
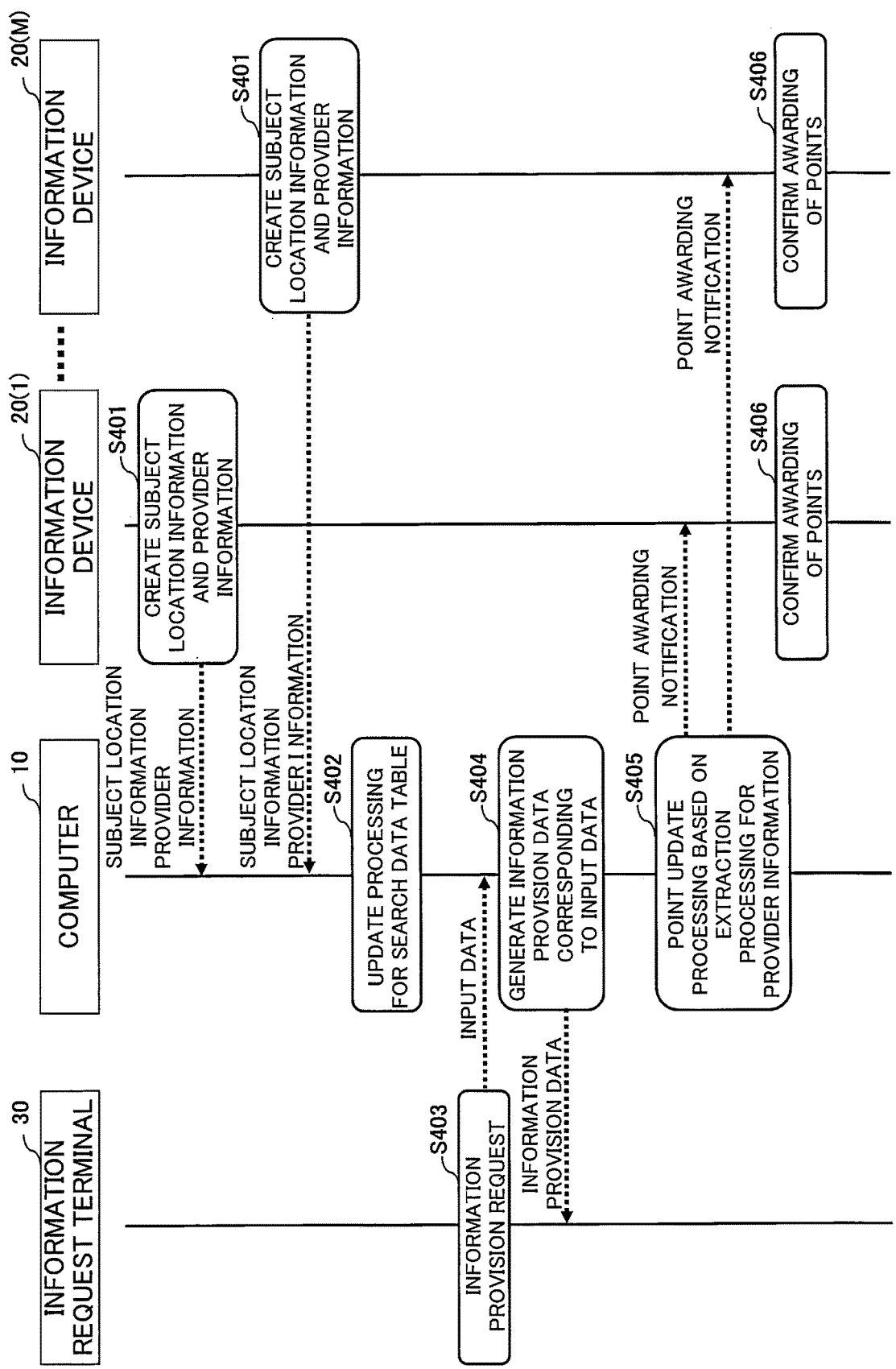
FIG. 4 is a flowchart for illustrating a cooperative operation of each component in the position information providing system according to the first embodiment of this disclosure.

Cooperation processing in the position information providing system according to the first embodiment is now described. FIG. 4 is a flowchart for illustrating a cooperative operation of each component in the position information providing system according to the first embodiment of this disclosure.

In FIG. 4, regarding the information device 20 being the provision source of the subject location information, two information devices of the information device 20(1) and the information device 20(M) are exemplified.

Moreover, processing executed by each component included in the computer 10 is hereinafter described while assuming that this processing is executed by the computer 10, which is a general name. Moreover, each component transmits and receives data via the network 40, but description is given while this intermediation by the network 40 is omitted.

Further, a specific description is hereinafter given of, as an example, a case in which subject location information on a product A1 is collected by the information device 20(1), and subject location information on a product A2 which is the same in product name and model as the product A1 is collected by the information device 20(M), and a request to provide information on a product A including the product A1 and the product A2 is made from the information request terminal 30.

First, in Step S401, the information device 20(1) generates the subject location information on the product A1, and transmits the generated subject location information to the computer 10. Similarly, in Step S401, the information device 20(M) generates the subject location information on the product A2, and transmits the generated subject location information to the computer 10.

In this manner, the plurality pieces of subject location information on the products A installed at different locations are collected to the computer 10.

In FIG. 4, a case in which the provider information is transmitted together with the subject location information from each of the information device 20(1) and the information device 20(M) is exemplified.

After that, in Step S402, the computer 10 executes the update processing for the search data table based on the subject location information and the provider information received from each of the information device 20(1) and the information device 20(M).

A timing at which the subject location information and the provider information on the product A1 are received from the information device 20(1) and a timing at which the subject location information and the provider information on the product A2 are received from the information device 20(M) are generally different from each other.

Thus, each time the subject location information and the provider information are received from a certain information device 20, the computer 10 generates the search data based on the received subject location information and provider information, and successively executes the update processing for the search data table through use of the generated search data.

The provider information transmitted together with the subject location information is to be used for the awarding of points in Step S405 and Step S406 described later.

After that, in Step S403, when, for example, a situation in which a certain manufacturer requires the information provision relating to the product A occurs, the information provision request is made. Specifically, in the information request terminal 30, the input data including the product name and the model for specifying the product A is set as the search keywords, and the input data is transmitted to the computer 10.

After that, in Step S404, when the computer 10 receives the input data for specifying the product A as the search keywords, the computer 10 generates information provision data corresponding to the input data.

Specifically, the computer 10 extracts, from the search data table stored in the storage unit 14, search data including the search keywords acquired as the input data. After that, the computer 10 generates the information provision data formed of a set of the search data extracted as a result of the search processing corresponding to the input data.

The service provider which provides the position information provision service can collect the service usage fee from the request source of the information provision in accordance with the content of the information provision, which is not shown in FIG. 4.

After that, in Step S405, the computer 10 extracts the provider information associated with the subject location information contributing to the information provision from the search data table stored in the storage unit 14. After that, the computer 10 awards the information use points to the provider corresponding to the extracted provider information.

Further, the computer 10 notifies the information device 20(1) and the information device 20(M) corresponding to the provider information that the information use points have been awarded. As a result, it is possible to award the information use points and to give a notification to the information providers contributing to the information provision.

After that, in Step S406, the information provider can confirm, by each of the information device 20(1) and the information device 20(M) receiving the notification from the computer 10, that the points have been awarded as a result of the use of the provided information.

The configuration regarding the points is not limited to the case in which the points are awarded to only the information provider which contributes to the information provision. For example, it is conceivable to award points at two levels by awarding fewer points to an information provider who has only provided the information to promote the information provision while awarding extra points in a case in which the information provision is used and hence contributes to the information provision.

As described above, according to the first embodiment, the service provider who provides the position information provision service can easily generate the search data table as the big data by receiving the subject location information on various products already existing in the market from the plurality of information devices.

In particular, with the position information providing system according to this disclosure which has the configuration of FIG. 1 and which can execute the processing of FIG. 4, it is possible to create, in advance, the search data table corresponding to each product model for the products already existing in the market before the information provision request from the service user is made. As a result, when the information provision request relating to various products is generated, it is possible to quickly provide information based on the search data table created in advance.

Further, as a result of the introduction of the incentive system which awards the points to the source of the provision of the subject location information used for the information provision, the provision of the subject location information which uses the information device can be promoted.

Further, with the position information providing system according to this disclosure, when the dedicated software for transmitting the subject location information to the computer is once installed in the information device, it is not basically required to execute update processing for the software. That is, unlike in a case of the related art, it is not required to develop and reinstall software for each product being a recall target.

Further, the position information providing system according to this disclosure is not limited to the information provision relating to the recall product, and for example, can quickly execute information provision relating to a product in accordance with the information provision request from a service user.

When the information provision request is made for a product X which is not a recall product, the information provision relating to the product X can quickly be executed. As a result, the service user can easily execute information analysis for a market trend such as a region in which the product X is widely used and a region in which the product X is not widely used.

Moreover, for example, also when an information provision request relating to a water level state at various positions on a map for a certain river Q is made, the position information providing system according to this disclosure can be used. The computer can collect big data on the water level state of the river Q by receiving, in advance or timely, the subject location information from the various positions of the river Q.

After that, the computer can execute, in response to the information provision request, the information provision for the water level state corresponding to each position by extracting data on the water level state of the river Q from the search data table.

When this information provision relating to the water level state is to be executed, it is conceivable to employ a configuration in which the information provider uses the information device to create subject location information to which, together with the subject identification information including image data, the name of the river Q is added as sound data or character data, and the subject location information is transmitted to the computer. The computer can easily specify the river Q as the search keyword by collecting such subject location information.

Moreover, when the computer has collected the subject identification information including the image data under a state in which the name of the river Q is not included, the computer can specify the search keyword by applying a method of specifying the name of the river by performing the deep learning on the image data.

That is, the computer can specify the name of the river through image recognition processing based on the deep learning by using image data on various rivers to execute, in advance, machine learning based on the deep learning so that the name of the river can be identified from the image data in the computer.

As another example, the computer may specify, as a keyword, the name of the river based on the position information included in the subject location information. As an example, the computer may store watershed data of each river and may specify, as the keyword, the name of the river based on a result of comparison between the position information and the watershed data.

In the above-mentioned first embodiment, the case in which the information device corresponds to the portable terminal or the like held by each information provider has been described, but the configuration is not limited to this case. The information provider in this disclosure is not limited to an owner of a product the information provision of which is executed, but an installer of the product, a general person who can capture the image of the product, and the like are conceivable. Thus, an information provider who can operate the information device can use the information device to generate the subject location information.

Second Embodiment

In the second embodiment, description is given of a case in which the information device 20 includes a clock which is capable of recognizing a current time of the generation of the image data, and the time information is used.

When the information device 20 includes the clock, the information device 20 can further transmit time information indicating a time of the acquisition of the subject location information when the subject location information is transmitted to the computer 10.

When the computer 10 can collect the time information, the computer can manage the search data table including the time information. The computer 10 can use the time information to execute, for example, the following information provision.

The computer 10 can additionally provide the time information when the information provision relating to the recall product is executed. As a result, the information provision requester can clearly estimate the time and the location at which the recall product existed. Further, when a plurality of locations for the same product exist in the data acquired as the information provision, the information provision requester can estimate that this product exists at a location corresponding to the latest time.

Moreover, the computer 10 can additionally provide the time information also when information provision relating to a product not being a recall product is executed. As a result, the information provision requester can refer to also the time information at the time of the information analysis for the market trend.

Moreover, the computer 10 can additionally provide the time information also when the information provision relating to the water level state of a river is executed. As a result, the information provision requester can grasp, as a time series, the water level state at the same position.

In other words, the information provision requester can easily grasp the transition state of the state by acquiring the time-series history data at a plurality of times at the same position. Thus, with the position information providing system according to this disclosure, it is possible to appropriately grasp the transition state of not only the water level state, but also various states such as those of an embankment and a debris flow.

As described above, according to the second embodiment, the service provider which provides the position information provision service can execute, by using the time information, the information provision having a higher utility value.

Third Embodiment

In the first embodiment and the second embodiment, description has been given of the case in which the information provision data is generated by extracting the data corresponding to the information provision request from the big data collected in advance, to thereby quickly provide the information to the requester.

In contrast, in the third embodiment, description is given of a case in which, after the information provision request is received, the information provision data is generated by collecting information matching this information provision request, to thereby provide information to the requester.

Figure 5:
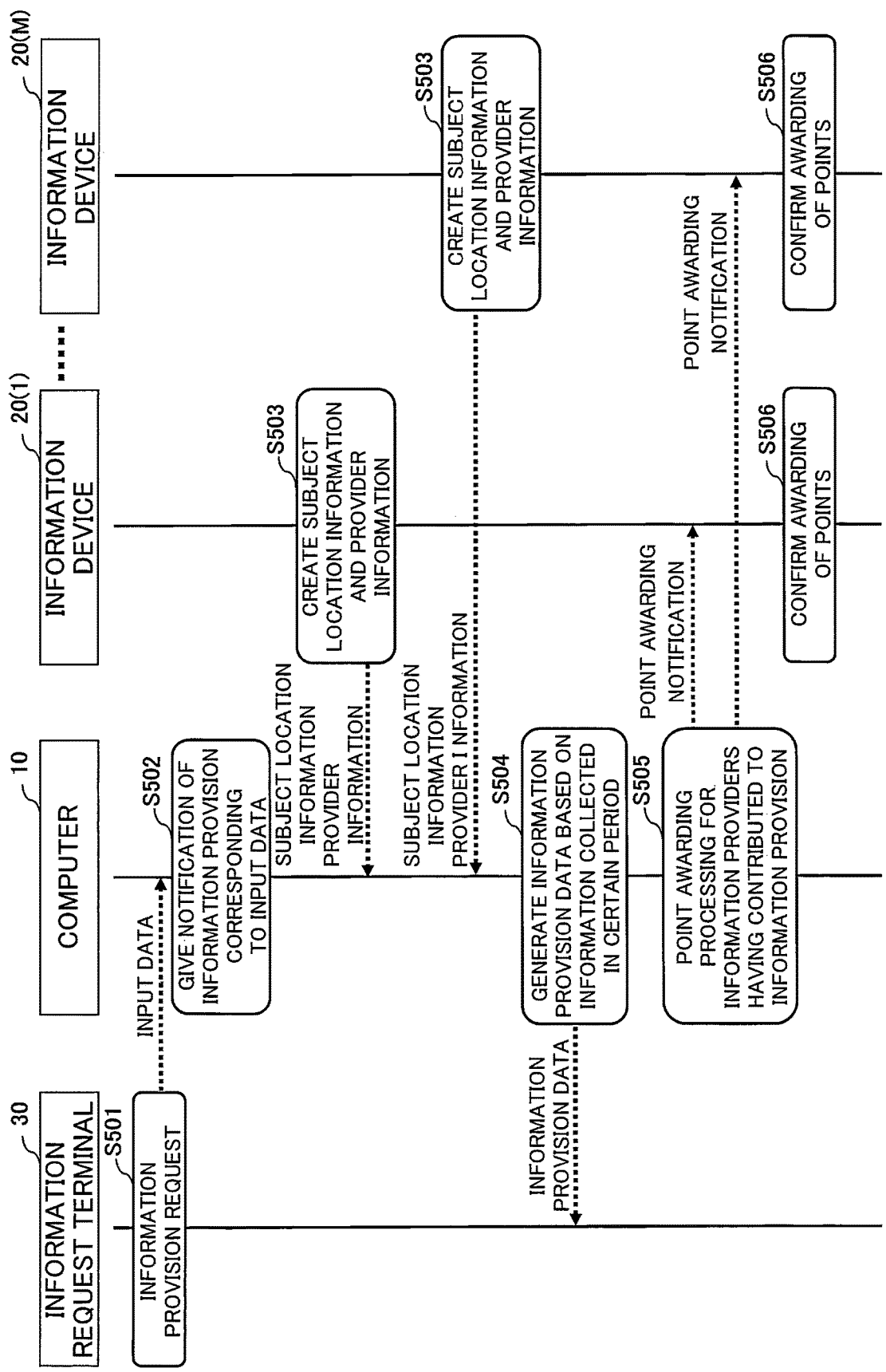
FIG. 5 is a flowchart for illustrating a cooperative operation of each component in a position information providing system according to a third embodiment of this disclosure.

The overall configuration of the position information providing system according to the third embodiment of this disclosure is similar to that of FIG. 1, and hence description thereof is omitted. Cooperative processing in the position information providing system according to the third embodiment is described. FIG. 5 is a flowchart for illustrating the cooperative operation of each component in the position information providing system according to the third embodiment of this disclosure.

In FIG. 5, regarding the information device 20 being the provision source of the subject location information, two information devices of the information device 20(1) and the information device 20(M) are exemplified.

Moreover, processing executed by each component included in the computer 10 is hereinafter described while assuming that this processing is executed by the computer 10, which is a general name. Moreover, each component transmits and receives data via the network 40, but description is given while this intermediation of the network 40 is omitted.

Further, a specific description is hereinafter given of, as an example, a case in which subject location information on the product A1 is collected by the information device 20(1), the subject location information on the product A2 which is the same in product name and model as the product A1 is collected by the information device 20(M), and the request to provide information on the product A including the product A1 and the product A2 is made from the information request terminal 30.

First, in Step S501, for example, when the situation in which a certain manufacturer requires the information provision relating to the product A occurs, the information provision request is made. Specifically, in the information request terminal 30, input data including search keywords for specifying the information provision content is set, and the input data is then transmitted to the computer 10. In description given below, it is assumed that input data including the product name and the model for specifying the product A is set as the search keywords.

After that, in Step S502, when the computer 10 receives the input data for specifying the product A as the search keywords, the computer 10 gives a notification of information provision relating to the product A corresponding to the input data. As a specific example of a notification method executed by the computer 10, the following methods are given.

Notification method 1: Through use of its own webpage, a newspaper advertisement, a TV commercial, and the like, an unspecified large number of persons are urged to provide the information relating to the product A.

Notification method 2: Through use of simultaneous communication to addresses of a list registered in association with the information devices 20, specific persons are urged to provide the information relating to the product A.

For the notification, it is also conceivable to designate a period in which the information provision is requested, a region in which the information provision is requested, and the like.

Moreover, when the notification method 1 or the notification method 2 is employed, in order to efficiently execute the information provision, it is also conceivable that dedicated software is transmitted from the computer 10 to be installed in advance in the information devices 20. The dedicated software is described in detail in the fourth embodiment described later.

After that, in Step S503, the information provider who can operate the information device 20(1) knows the notification for the information provision relating to the product A, and thus the information provider can use the information device 20(1) to generate the subject location information relating to the product A1, and can transmit the generated subject location information to the computer 10.

Similarly, in Step S503, the information provider who can operate the information device 20(M) knows the notification for the information provision relating to the product A, and thus the information provider can use the information device 20(M) to generate the subject location information relating to the product A2, and can transmit the generated subject location information to the computer 10.

In this manner, a plurality of pieces of subject location information relating to the products A installed in different locations are generated in response to the notification by a large number of information providers who know the notification for the information provision relating to the product A, and are collected by the computer 10.

In FIG. 5, the case in which the provider information is transmitted together with the subject location information from each of the information device 20(1) and the information device 20(M) is exemplified.

After that, in Step S504, the computer 10 generates, as data corresponding to the input data, the information provision data relating to the product A based on the subject location information received from each of the information device 20(1) and the information device 20(M).

Specifically, the computer 10 generates the information provision data formed of a set of pieces of the subject location information received from a large number of information providers.

The service provider which provides the position information provision service can collect the service usage fee from the request source of the information provision in accordance with the content of the information provision, which is not shown in FIG. 5.

After that, in Step S505, the computer 10 awards the information use points to the information providers having contributed to the information provision based on the provider information associated with the subject location information having contributed to the information provision.

Further, the computer 10 notifies the information device 20(1) and the information device 20(M) corresponding to the provider information of the awarding of the information use points. As a result, it is possible to award the information use points and give the notification to the information providers having contributed to the information provision.

After that, in Step S506, each of the information device 20(1) and the information device 20(M) receives the notification from the computer 10, and thus the information provider can confirm that the points have been awarded as a result of the use of the provided information.

As described above, according to the third embodiment, the service provider who provides the position information provision service can easily and timely generate the information provision data reflecting the current state in response to the information provision request by receiving the subject location information on various products already existing in the market from the plurality of information devices.

In particular, with the position information providing system according to this disclosure having the configuration of FIG. 1 and capable of executing the processing of FIG. 5, it is possible to easily collect, through use of the image data, the information provision data corresponding to the information provision request from the service user, and to provide the information provision data. As a result, in response to various information provision requests, information on information provision data reflecting the current state can be quickly provided.

In the above-mentioned specific example, there has been exemplified the case in which, in order to collect the information on the installation places relating to the product A, the information is provided in response to the information provision request from the service user. In place of this information provision, in response to a timely information provision request made from the service user and relating to, for example, information on damage caused by a typhoon, information on prices at gas stations, and a congestion situation on an expressway, it is possible to quickly collect information, and to provide the information through use of the image data.

That is, it is possible to easily achieve a service form capable of quickly providing the information within a certain determined period in response to any information provision request from the service user.

Further, as a result of the introduction of the incentive system which awards the points to the source of the provision of the subject location information used for the information provision, the provision of the subject location information which uses the information device can be promoted.

Further, with the position information providing system according to this disclosure, when the dedicated software for transmitting the subject location information to the computer is once installed in the information terminal, it is not basically required to execute update processing for the software. That is, unlike in the case of related art, it is not required to develop and reinstall software for each product being the recall target.

Fourth Embodiment

In the fourth embodiment, the dedicated software which can be installed in the information device 20 and which is effective for improving operability and efficiency at the time of the transmission of the subject location information based on the image data captured by the camera function of the information device 20 to the computer 10 side is described in detail.

(1) Regarding Improvement of Operability

It is possible to improve the operability at the time of the transmission of the required information from the information device 20 to the computer 10 by installing in advance, in the information device 20 side, dedicated software for transmitting to the computer 10 the subject location information and the provider information as a set.

The information provider can use this dedicated software to easily transmit the image data captured through use of the camera function of the information device 20 to the predetermined computer 10. That is, the information provider can easily transmit, to the computer 10 side, the subject location information based on the image data and the provider information as the set by using the dedicated software after setting the provider information and an address of the computer 10.

(2) Regarding Improvement of Efficiency of Information Provision

For example, it is possible to suppress a transmission volume and to efficiently collect information on the computer side by installing in advance, in the information device 20 side, dedicated software for allowing the information required for the information provision to be extracted and transmitted.

The information provider can use this dedicated software to extract the required information worth the information provision from the image data captured through use of the camera function of the information device 20, and easily transmit the extracted information.

As this dedicated software, there is given software having a function capable of automatically extracting, from the image, a target for which the information provision is requested through use of, for example, an AI technology. The information provider can extract the required information worth the information provision, through use of the dedicated software having this automatic extraction function, from a plurality of pieces of captured image data without being aware of whether or not a photographing target is the required information worth information provision, and can easily transmit the extracted information.

Moreover, also on the computer 10 side, it is possible to eliminate or to suppress, by collecting the information from the information device 20 in which the dedicated software having the above-mentioned automatic extraction function is installed, the processing of extracting the required information worth the information provision from an enormous amount of data transmitted from the side of the plurality of information devices 20, and hence efficient information collection can be achieved.

As the function of automatically extracting the information provision target through use of the AI technology, a machine learning function based on the deep learning can be used.

As a specific example of using the dedicated software having the automatic extraction function, for example, the following examples are given.

Specific Example 1: Application Relating to Recall Product

For example, there is assumed a case in which a defect in terms of production is found in a product A of a certain manufacturer, collection of the products A as recall products comes to be required, and a notification of information provision relating to the product A is given. In this case, by installing, in the information terminal 20, dedicated software for automatically extracting the product A being the information provision content from image data, the information provider can capture image data without being aware of whether or not a photographing target is the product A to automatically extract image data on the product A, and can transmit to the computer 10 the subject location information generated for the automatically extracted image data.

As another example, the information provider can provide the information relating to the product A, by using the dedicated software for automatically extracting the product A from the image data, not only for image data captured after the notification, but also in a case in which image data relating to the product A is included in image data already captured before the notification.

Specific Example 2: Application Relating to Specification of River, Dam, Seacoast, and the Like For example, there is assumed a case in which a situation in which a transition state of a specific river is required to be known occurs, and a notification of information provision relating to the specific river is given. In this case, by installing in advance, in the information device 20, dedicated software for automatically extracting the specific river being the information provision content from image data, the information provider can capture image data without being aware of whether or not a photographing target is the specific river to automatically extract image data on the specific river, and can transmit to the computer 10 the subject location information generated for the automatically extracted image data.

As another example, the information provider can provide the information relating to the specific river also in a case in which image data relating to the specific river is included in image data already captured before the notification by using the dedicated software for automatically extracting the specific river from the image data.

Specific Example 3: Application Relating to Search for Specific Person

For example, there is assumed a case in which search for a specific person such as a wanted person or a suspect comes to be required, and a notification of information provision relating to the specific person is given. In this case, by installing in advance, in the information device 20, dedicated software for automatically extracting the specific person being the information provision content from image data, the information provider can capture image data without being aware of whether or not a photographing target is the specific person to automatically extract image data on the specific person, and can transmit to the computer 10 the subject location information generated for the automatically extracted image data.

As another example, the information provider can provide the information relating to the specific person also in a case in which image data relating to the specific person is included in image data already captured before the notification by using the dedicated software for automatically extracting the specific person from the image data.

The dedicated software can have not only the automatic extraction function, but also a function for automatic transmission to the computer 10.

(3) Regarding Installation Method for Dedicated Software

A supplementary description is now given of a specific method of installing the dedicated software such as that described in the section (1) or the section (2) in the information device 20.

It is conceivable that the service provider who provides the position information provision service presents, for example, a QR code to provide the dedicated software when the information provision is notified to an unspecified large number of persons through use of its own webpage, a newspaper advertisement, a television advertisement, and the like.

The information provider holding the information device 20 can easily install the dedicate software corresponding to the information provision notified from the service provider by reading the QR code through use of the camera function of the information device 20.

Moreover, by setting in advance, an expiration date for the dedicated software, it is possible to deactivate the function capable of extracting and transmitting the information required for the information provision in the information device 20 having the dedicated software installed therein when the expiration date is reached.

As described above, according to the fourth embodiment, it is possible to achieve the improvement of the operability or the improvement of the efficiency of the information provision by installing the dedicated software suitable to the information provision in the information device. In particular, it is possible to easily narrow down information to the information worth the information provision by installing, in the information device, the dedicated software which is capable of extracting required information worth the information provision from the image data, and hence the position information providing system which efficiently executes desired information provision after suppressing the amount of information to be uploaded from the information device to the computer can be achieved.

The dedicated software can have a function of automatic transmission to the computer simultaneously with the automatic extraction function. When dedicated software simultaneously has those functions, the user of the dedicated software can automatically collect and transmit the required information without determining whether or not the information is the required information worth the information provision. Thus, efficient data collection can be achieved.

Fifth Embodiment

In the first embodiment to the fourth embodiment described above, the position information providing systems having the following feature 1 to feature 3 have been described in detail.

Feature 1: The information device includes a GPS sensor and a camera, and extracts image data including subject identification information for identifying a photographing subject from image data acquired by the camera, and generates subject location information that associates position information acquired by the GPS sensor and the subject identification information with each other.

Feature 2: The computer generates information provision data based on the subject location information generated by the information device.

Feature 3: The information device having the feature 1 further has installed therein dedicated software installed therein for extracting, from a plurality of pieces of the acquired image data, image data including the subject identification information as required information worth information provision, and generates the subject location information for the image data extracted through use of the dedicated software, and transmits the generated subject location information to the computer.

That is, in the position information providing systems according to the first embodiment to the fourth embodiment having the feature 1 to the feature 3, the information device 20 includes the GPS sensor, and the position information is specified by the GPS sensor in accordance with a movement position of the information provider holding the information device.

Further, in the position information providing systems according to the first embodiment to the fourth embodiment having the feature 1 to the feature 3, the information provider holds the information device 20 being a mobile terminal, and the information provider uses the camera to capture the image data worth the information provision.

In contrast, in the fifth embodiment, the position information providing system having the following feature 4 to feature 6 is described in detail.

Feature 4: The information device is installed at a fixed position, and includes a clock which provides time information and a camera. The information device extracts person image data from image data acquired by the camera, and generates person location information that associates position information relating to the fixed position, the person image data, and time information on a time of acquisition of the person image data with one another.

Feature 5: The computer generates information provision data for specifying a person that has existed at the fixed position and a time of the existence based on the person location information generated by the information device.

Feature 6: The information device having the feature 4 further has installed therein dedicated software for extracting, from a plurality of pieces of the acquired image data, as the person image data, a specific person registered as required information worth information provision, and generates the person location information for the person image data extracted through use of the dedicated software, and transmits the generated person location information to the computer.

That is, in the position information providing system according to the fifth embodiment having the feature 4 to the feature 6, the information device is installed at a fixed position, and hence the GPS sensor is not required. Thus, the position information is uniquely specified through use of the fixed position for each facility. Moreover, as the specific person being the photographing subject, the position information providing system is specialized in a person to be searched for such as a wanted person, a suspect, a missing person, a loitering person, and a missing child.

Moreover, in the position information providing system according to the fifth embodiment having the feature 4 to the feature 6, it is important to provide information relating to a time and a location at which the specific person existed, and hence the information device standardly has a function of a clock which provides the time information.

Moreover, in the position information providing system according to the fifth embodiment having the feature 4 to the feature 6, when a person himself or herself worth the information provision visits a facility or the like or passes through the facility, an image of the person is collected as person image data by the information device 50 fixedly installed in the facility, and hence the information provider is a facility manager.

Further, in the position information providing system according to the fifth embodiment having the feature 4 to the feature 6, the person to be searched for is specified by the dedicated software, and hence the information request terminal 30 is not basically required when the dedicated software is used. The position information providing system according to the fifth embodiment is now described with reference to the drawings.

Figure 6:
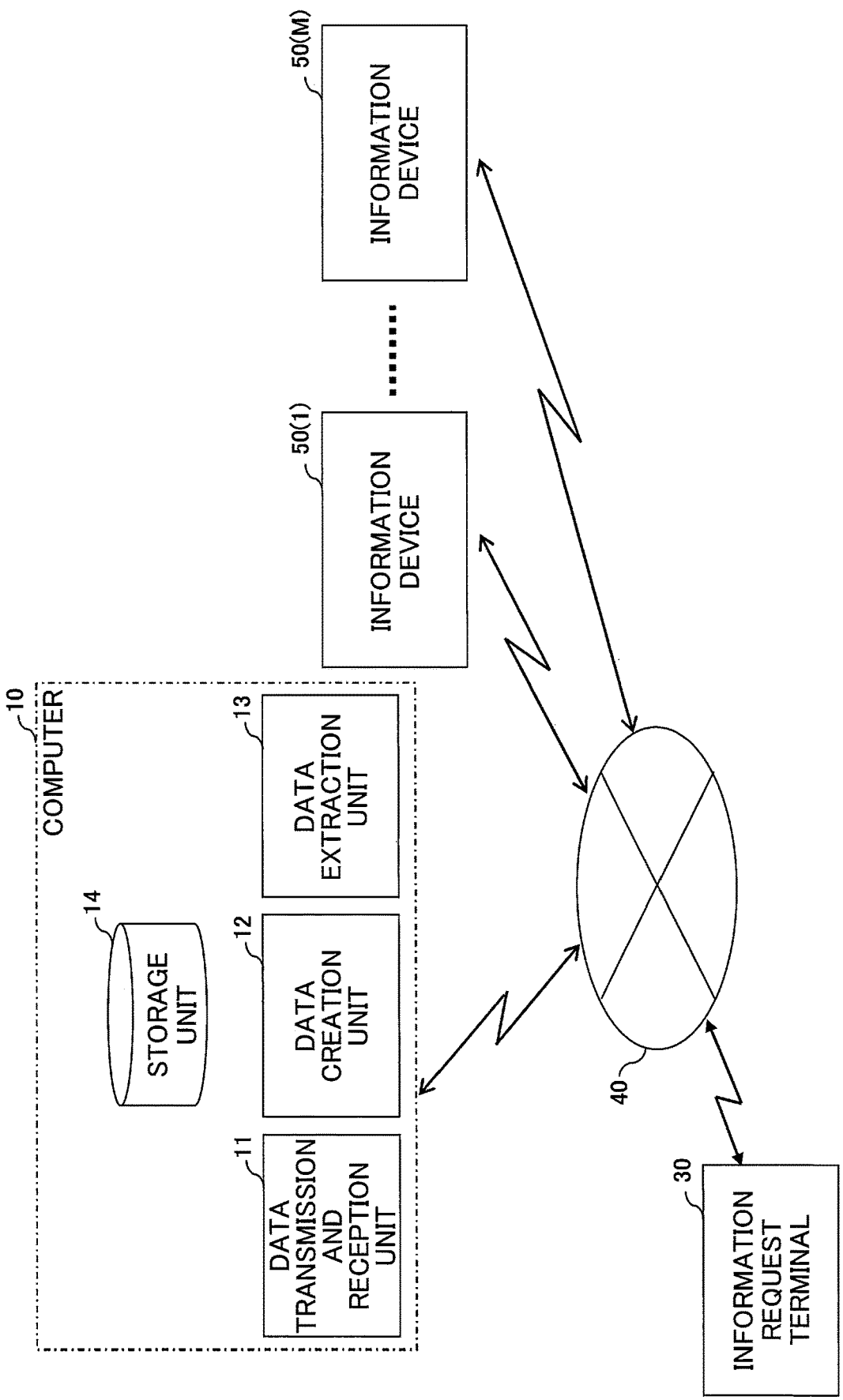
FIG. 6 is a diagram for illustrating an overall configuration of a position information providing system according to a fifth embodiment of this disclosure.

FIG. 6 is a diagram for illustrating an overall configuration of the position information providing system according to the fifth embodiment of this disclosure. The position information providing system according to the fifth embodiment is formed of the computer 10, M information devices 50(1) to 50(M), the information request terminal 30, and the network 40. Compared with the configuration of FIG. 1, the configuration of FIG. 6 is different in such a point that the M information devices 50(1) to 50(M) fixedly disposed in facilities are provided in place of the M information devices 20(1) to 20(M) corresponding to the mobile terminals.

The number of information devices 50 is not limited to M, and is only required to be one or more. Moreover, the number of information request terminals 30 is not limited to one, and may be two or more. Moreover, mutual communication between the M information devices 50(1) to 50(M) and the information request terminal 30 may be wireless communication or wired communication, and it is also possible to employ a configuration in which the mutual communication is not always executed via the network 40.

Each of the information devices 50(1) to 50(M) in the fifth embodiment corresponds to a device fixedly disposed in each facility, for example, a convenience store, a home for the aged, a department store, a station, or a commercial facility. Each of the information devices 50(1) to 50(M) includes the clock which provides the time information and the camera which captures the image data.

Each of the information devices 50(1) to 50(M) is fixedly disposed in the facility and does not move, and is thus not required to include the GPS sensor. Thus, fixed position information can be set therefor in advance. Each of the M information devices is hereinafter simply described as "information device 50" when it is not required to distinguish the M information devices from one another.

The information device 50 fixedly disposed in the facility can use the camera to capture, as the person image data, a person who visits the facility or passes through the facility. The person image data acquired by the camera provided to the information device 50 is not limited to a still image, but may be a moving image.

As the person image data worth the information provision in the fifth embodiment, an image of a specific person such as a wanted person, a suspect, a missing person, a loitering person, and a missing child is given. Information on the specific person worth the information provision can be set by the information request terminal 30. Moreover, when the dedicated software is used, the information on the specific person worth the information provision is set in the dedicated software, and in this case, the information request terminal 30 is not required.

The information device 50 is fixedly disposed in the facility, and hence unique position information can be set therefor in advance. That is, the image data captured by the information device 50 can be managed as data associated with the unique position information. The position information is not limited to two-dimensional data, and three-dimensional data including the height direction as well may be used.

The information device 50 in the fifth embodiment creates person location information which associates the person image data, the position information on the fixed position, and the time information on the time of acquisition of the person image data with one another, and transmits the person location information to the computer 10. It is conceivable to install in advance, as required, dedicated software in the information device 50 in order to efficiently create and transmit the person location information. The dedicated software is described later.

Thus, the information device 50 fixedly disposed in the facility can use the dedicated software to easily generate the person location information associating the person image data acquired by the camera, the position information corresponding to the place of the facility, and the time information on the time of acquisition of the person image data with one another, and to easily transmit the generated person location information as the big data to the computer 10 which summarizes the big data.

The computer 10 which summarizes the big data includes the data transmission and reception unit 11, the data creation unit 12, the data extraction unit 13, and the storage unit 14. In FIG. 6, the number of computers 10 is exemplified as one, but the computer 10 in this disclosure is not limited to the configuration of FIG. 6. For example, another configuration such as the redundant configuration including a backup or the configuration including a plurality of computers disposed in a distributed manner may also be employed as the computer 10.

The data transmission and reception unit 11 can receive the person location information from each of the information devices 50(1) to 50(M) via the network 40. That is, the computer 10 can easily collect, as the big data, the person location information acquired in the information device 50 installed in the facility at the known place.

The person location information collected in the computer 10 is not necessarily limited to a wanted person, a suspect, a missing person, a loitering person, a missing child, and the like, and, as an example, all persons passing through the facility can be the target. That is, the computer 10 can collect, for a person passing through the facility regardless of whether or not this person is a wanted person, a suspect, a missing person, a loitering person, a missing child, or the like, the person location information associating the person image data, the position information, and the time information on the time of acquisition of the person image data with one another from a large number of information devices 50 as the big data.

Next, the dedicated software which can be installed in the information device 50 in the fifth embodiment and which is effective for improving operability and efficiency at the time of the transmission of the person location information based on the person image data captured by the camera function of the information device 50 to the computer 10 side is described in detail.

(1) Regarding Improvement of Operability

It is possible to improve the operability at the time of the transmission of the required information from the information device 50 to the computer 10 by installing in advance, in the information device 50 side, dedicated software for transmitting the person location information to the computer 10.

A facility manager in the installation place of the information device 50 can use this dedicated software to extract, as the person image data, the specific person registered as the required information worth the information provision from the image data captured through use of the camera function of the information device 50, and easily transmit the person image data to a predetermined computer 10.

That is, the facility manager can easily transmit the person location information based on the person image data to the computer 10 side by using the dedicated software after setting the address of the computer 10.

(2) Regarding Improvement of Efficiency of Information Provision

For example, it is possible to suppress the transmission volume and to efficiently collect information on the computer 10 side by installing in advance, in the information device 50 side, dedicated software for allowing the required information worth the information provision to be extracted and transmitted.

The facility manager can use this dedicated software to extract, as the person image data, the specific person registered as the required information worth the information provision from the image data captured through use of the camera function of the information device 50, and easily transmit the person image data. As the required information worth the information provision in the fifth embodiment, an image of a person to be searched for such as a wanted person, a suspect, a missing person, a loitering person, and a missing child is given.

As this dedicated software, for example, there is given software having a function capable of automatically extracting a person image for which the information provision is requested, from the person image data through use of, for example, the AI technology. The facility manager can use the dedicated software having this automatic extraction function to extract the person image data as the required information worth the information provision, from a plurality of pieces of captured image data without being aware of whether or not the person being the photographing target is the required information worth information provision, and easily transmit the extracted information.

In other words, by using the dedicated software, quick information transmission having a suppressed transmission volume is achieved by editing the person image data obtained by narrowing down to the required information worth the information provision on the information device 50 side, and then automatically transmitting the person image data to the computer 10 side.

Moreover, also on the computer 10 side, by collecting information from the information device 50 in which the dedicated software having the above-mentioned automatic extraction function is installed, it is possible to eliminate or to suppress the processing of extracting, as the person image data, the specific person registered as the required information worth the information provision from an enormous amount of image data transmitted from the side of the plurality of information devices 50, and hence efficient information collection can be achieved.

As a specific example of using the dedicated software having the automatic extraction function, for example, the following examples are given.

Specific Example: Application Relating to Search for Specific Person

For example, there is assumed a case in which search for a specific person such as a wanted person, a suspect, a missing person, a loitering person, and a missing child comes to be required, and a notification of information provision relating to the specific person is given. In this case, by installing in advance, in the information device 50, dedicated software for automatically extracting, from image data, person image data on a certain specific person being the information provision content, the information device 50 can capture image data without being aware of whether or not a photographing target is the specific person to automatically extract person image data on the specific person, and can transmit to the computer 10 the person location information generated for the automatically extracted person image data.

As another example, the information device 50 can provide information relating to the specific person also in a case in which person image data relating to the specific person is included in person image data already captured before the notification by using the dedicated software for automatically extracting the person image data on the specific person from the image data.

As described above, the following advantages are also provided by using the past person image data already captured before the notification. For example, in a case in which search for a loitering person or a missing child comes to be required, and a notification of information provision relating to the specific person is given, a material for grasping an activity pattern, a tendency, and the like of the specific person before the loitering or the missing can be obtained by extracting the specific person from the past person image data, and the material can effectively be used as an aid for the search.

Meanwhile, the computer 10 specifies a person who has visited or passed through the facility based on the person location information generated by the information device 50, and can generate information provision data for specifying the person who has existed at the fixed position at which the information device 50 is installed and the time of the existence. As a result, the photographing subject is specialized in the person to be searched for such as a wanted person, a suspect, a missing person, a loitering person, and a missing child, and the time and position of the existence or an activity history of the person to be searched for can easily be specified.

The dedicated software can have not only the automatic extraction function, but also the function of automatic transmission to the computer 10.

As described above, according to the fifth embodiment, the information device is fixedly installed in the facility, and hence the GPS sensor is not required. Thus, after the position information is uniquely specified by the fixed position for each facility, a location history can be monitored while specializing in the specific person to be searched for such as a wanted person, a suspect, a missing person, a loitering person, and a missing child. That is, also with the fifth embodiment not including the GPS sensor, it is possible to provide the position information providing system suitable to the provision of information including the position information on the photographing subject.

Further, according to the fifth embodiment, it is possible to achieve the improvement of the operability or the improvement of the efficiency of the information provision by installing the dedicated software suitable to the information provision in the information device. In particular, the position information providing system which efficiently executes desired information provision can be achieved after suppressing the amount of information to be uploaded from the information device to the computer by installing, in the information device, the dedicated software which is capable of extracting, as the person image data, the specific person registered as the required information worth the information provision from the image data.

The information provision which uses the above-mentioned dedicated software can also be applied to past image data obtained before the specific person to be searched for is notified. As a result, irrespective of whether the time is before or after the notification, the activity pattern of the specific person in a desired time period can easily be collected.

Sixth Embodiment

In the above-mentioned fifth embodiment, description has been given of the case in which the information device is installed at a fixed position and hence the GPS sensor is not required, and the position information is uniquely specified through use of the fixed position for each facility.

In contrast, in the sixth embodiment, a case in which the information device is installed in a specific moving vehicle such as a school bus, a kindergarten bus, and a pickup vehicle for the elderly and the like for daycare is an application target, and description is given of the position information providing system suitable to the provision of information relating to boarding and exiting passengers. However, as a place at which the information device is installed in this disclosure, a moving body other than a vehicle is conceivable, and the moving vehicle described below is included in the moving body.

In the sixth embodiment, the information device is installed in the specific moving vehicle, and hence the position of the moving vehicle itself is not necessarily a fixed position. However, when it is desired to acquire position information indicating that a person has boarded or exited from the specific moving vehicle, it is not required to grasp a geographical position through use of the GPS sensor. As the position information indicating that the person has boarded or exited from the moving vehicle, it is sufficient to employ unique information allocated to the information device fixedly disposed in the moving vehicle. Thus, the information device in the sixth embodiment, as in the fifth embodiment, does not require the GPS sensor, and is fixedly disposed in a cabin of the specific moving vehicle.

Moreover, as the photographing subject, the position information providing system is specialized in the person boarding and exiting from the specific moving vehicle. Further, for the position information providing system according to the sixth embodiment, it is important to provide information relating to a time of the use of the moving vehicle by the specific person, and hence the information device standardly has the function of the clock which provides the time information.

In the sixth embodiment, the position information providing systems having the following feature 7 to feature 9 are described in detail.

Feature 7: The information device is installed at a fixed position of a specific moving body, and includes a clock which provides time information and a camera, and extracts, as person image data, a person that boards or exits from the specific moving body from image data acquired by the camera, and generates person location information that associates position information indicating that the person has boarded or exited from the specific moving body, the person image data, and time information on a time of acquisition of the person image data with one another.

A case in which it is difficult for the information device to identify whether the specific person is a person who has boarded the specific moving vehicle or a person who has exited from the specific moving vehicle based on only one piece of image data is conceivable. However, the information device can also specify a moving direction by recognizing the person based on a plurality of pieces of the image data acquired as a time series, and hence can identify whether the specific person has boarded or exited from the specific moving vehicle.

As another example, the information device can identify whether the specific person has boarded or exited from the specific moving vehicle through use of also information obtained by a passage sensor used to identify the moving direction by installing the passage sensor at a doorway of the specific moving vehicle, and installing a camera at a fixed position such that the camera captures the image data at the doorway.

As another example, the information device recognizes a person based on time series data on images including both of image data at a vehicle exit position (that is, a region outside the moving vehicle) and image data at a vehicle boarding position (that is, a region inside the moving vehicle) under a state in which a door of the doorway of the specific moving vehicle is open, to thereby be able to determine whether the person has moved from the exit position to the boarding position or from the boarding position to the exit position. Consequently, the information device can identify whether the person has exited or boarded from the specific moving vehicle.

Even when the boarding or the exiting cannot be identified, when it can be specified that the specific person is included in the image data captured by the information device fixedly disposed in the moving vehicle, it can be specified that the specific person is considered to have used the moving vehicle, and a time of this use can be specified. As a result, valuable information can be provided.

Feature 8: The computer generates information provision data for specifying a person that has boarded or exited from the specific moving body and a boarding or exiting time based on the person location information generated by the information device.

Feature 9: The information device having the feature 7 further has installed therein dedicated software for extracting, from a plurality of pieces of the acquired image data, as the person image data, a specific person registered as required information worth information provision, and generates the person location information for the person image data extracted through use of the dedicated software, and transmits the generated person location information to the computer.

In the position information providing system according to the sixth embodiment having the feature 7 to the feature 9, when a person himself or herself worth the information provision has boarded or exited from the specific moving vehicle, the image of the person is collected as the person image data by the information device 60 fixedly installed in the specific moving vehicle, and the information provider is a manager who owns the specific moving vehicle or a driver. The position information providing system according to the sixth embodiment is now described with reference to the drawings.

Figure 7:
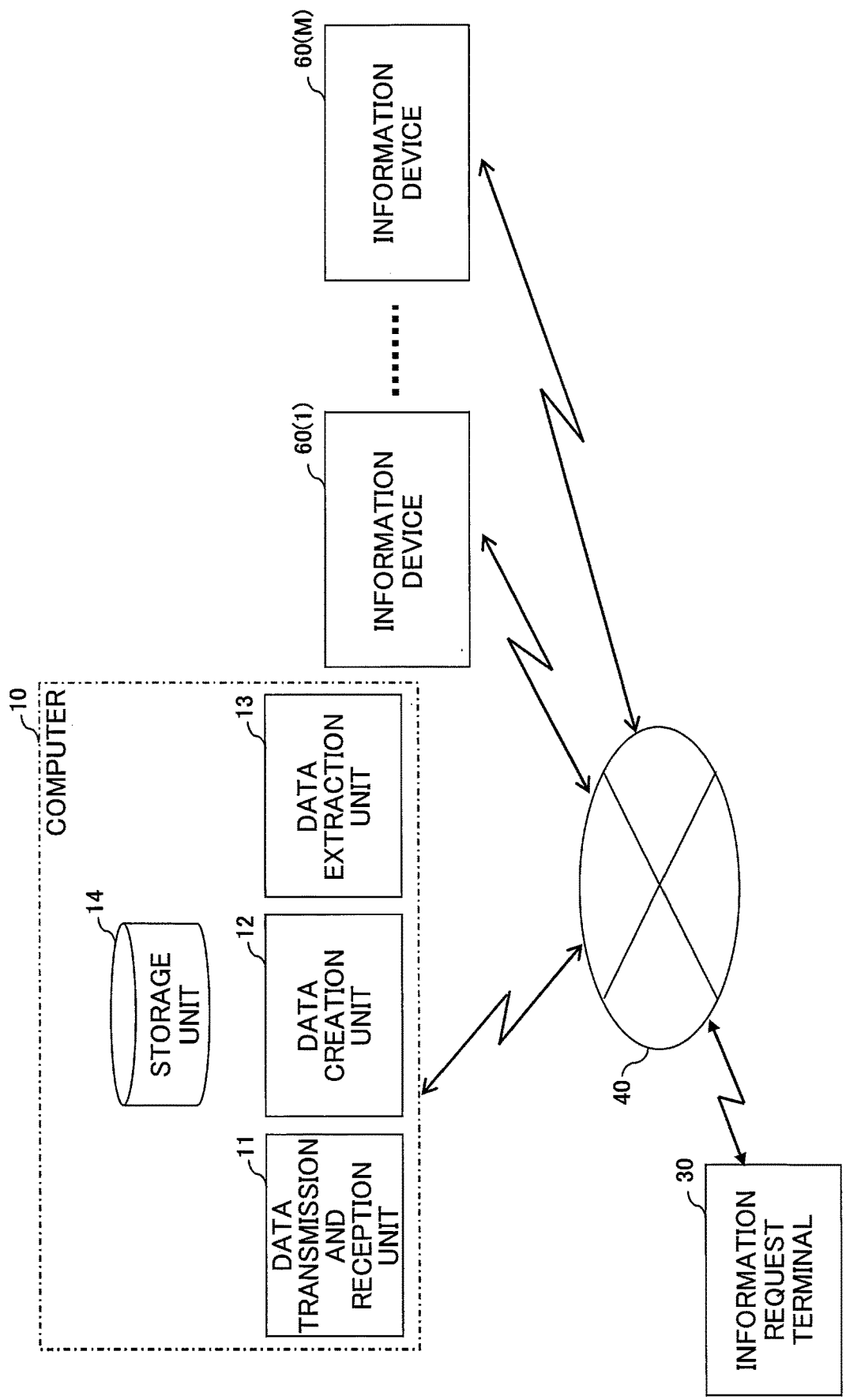
FIG. 7 is a diagram for illustrating an overall configuration of a position information providing system according to a sixth embodiment of this disclosure.

FIG. 7 is a diagram for illustrating an overall configuration of the position information providing system according to the sixth embodiment of this disclosure. The position information providing system according to the sixth embodiment is formed of the computer 10, M information devices 60(1) to 60(M), the information request terminal 30, and the network 40. Compared with FIG. 1, FIG. 7 is different in such a point that the M information devices 60(1) to 60(M) fixedly disposed in specific moving vehicles are provided in place of the M information devices 20(1) to 20(M) corresponding to the mobile terminals.

The number of information devices 60 is not limited to M, and is only required to be one or more. Moreover, the number of information request terminals 30 is not limited to one, and may be two or more. Moreover, mutual communication between the M information devices 60(1) to 60(M) and the information request terminal 30 may be wireless communication or wired communication, and it is also possible to employ a configuration in which the mutual communication is not always executed via the network 40.

Each of the information devices 60(1) to 60(M) in the sixth embodiment corresponds to a device fixedly disposed in the specific moving vehicle, for example, a school bus, a kindergarten bus, and a pickup vehicle for the elderly and the like for daycare. Each of the information devices 60(1) to 60(M) includes the camera which captures a person who has boarded or exited from the specific moving vehicle as the image data.

Each of the information devices 60(1) to 60(M) is fixedly disposed inside the specific moving vehicle, and moves together with the moving vehicle, but cannot move to any position outside the moving vehicle. Thus, each of the information devices 60(1) to 60(M) is not required to include the GPS sensor, and fixed position information indicating the position inside the specific moving vehicle can be set therefor in advance. Each of the M information devices is hereinafter simply described as "information device 60" when it is not required to distinguish the M information devices from one another.

The information device 60 fixedly disposed inside the specific moving vehicle can use the camera to capture the person who has boarded or exited from the specific moving vehicle as the person image data. The person image data acquired by the camera provided to the information device 60 is not limited to a still image, but may be a moving image.

As the person image data worth the information provision in the sixth embodiment, an image of a specific person such as a kindergartener permitted and registered to use a specific kindergarten bus for going to a specific kindergarten and an elderly person permitted and registered to use a pickup bus prepared by a specific facility for elderly persons is given.

Information on the specific person worth the information provision can be set by the information request terminal 30. Moreover, when the dedicated software is used, the information on the specific person worth the information provision is set in the dedicated software, and in this case, the information request terminal 30 is not required.

The information device 60 is fixedly disposed in the specific moving vehicle, and hence unique position information indicating the position inside the specific moving vehicle can be set therefor in advance. That is, the image data captured by the information device 60 can be used as data associated with the unique position information to manage whether or not a person who has boarded or exited from the specific moving vehicle exists.

The information device 60 in the sixth embodiment creates person location information which associates the person image data, the position information on the fixed position indicating that the position is in the specific moving vehicle, and the time information on the time of acquisition of the person image data with one another, and transmits the person location information to the computer 10. It is conceivable to install in advance, as required, dedicated software in the information device 60 in order to efficiently create and transmit the person location information. The dedicated software is described later.

Thus, the information device 60 fixedly disposed in the specific moving vehicle can use the dedicated software to easily generate the person location information associating the person image data acquired by the camera, the position information indicating that the position is in the specific moving vehicle, and the time information on the time of acquisition of the person image data with one another, and to easily transmit the generated person location information to the computer 10.

The computer 10 which summarizes the person location information transmitted from each information device 60 includes the data transmission and reception unit 11, the data creation unit 12, the data extraction unit 13, and the storage unit 14. In FIG. 7, the number of computers 10 is exemplified as one, but the computer 10 in this disclosure is not limited to the configuration of FIG. 7. For example, another configuration such as the redundant configuration including a backup, the configuration including a plurality of computers disposed in a distributed manner, or an individual configuration for each specific moving vehicle may be employed as the computer 10.

The data transmission and reception unit 11 can receive the person location information from each of the information devices 60(1) to 60(M) via the network 40. That is, the computer 10 can easily collect and manage the person location information acquired by the information device 60 installed in, for example, each of the moving vehicles in the specific kindergarten which uses the plurality of moving vehicles for going to the kindergarten.

The person location information collected by the computer 10 is not necessarily limited to the person location information on the user registered to use the specific moving vehicle, and all persons who use the specific moving vehicle may be the target as an example.

That is, the computer 10 can collect, for all of the persons who use the specific moving vehicle, the person location information which associates the person image data, the position information, and the time information on the time of acquisition of the person image data with one another as the big data from a large number of information devices 60, and can also manage the use of the specific moving vehicle by persons who are not registered.

Next, the dedicated software which can be installed in the information device 60 in the sixth embodiment and which is effective for improving operability and efficiency at the time of the transmission of the person location information based on the person image data captured by the camera function of the information device 60 to the computer 10 side is described in detail.

(1) Regarding Improvement of Operability

It is possible to improve the operability at the time of the transmission of the required information from the information device 60 to the computer 10 by installing, in advance, dedicated software for transmitting the person location information to the computer 10 on the information device 60 side.

The manager, the driver, or the like of the specific moving vehicle in which the information device 60 is installed can use this dedicated software to extract the specific person registered as the required information worth the information provision from the image data captured through use of the camera function of the information device 60, and easily transmit the person image data to a predetermined computer 10.

That is, the manager, the driver, or the like can easily transmit the person location information based on the person image data to the computer 10 side by using the dedicated software after setting the address of the computer 10.

(2) Regarding Improvement of Efficiency of Information Provision

For example, it is possible to suppress the transmission volume and to efficiently collect information on the computer 10 side by installing in advance, in the information device 60 side, dedicated software for allowing the required information worth the information provision to be extracted and transmitted.

The manager, the driver, or the like can use this dedicated software to extract, as the person image data, the specific person registered as the required information worth the information provision from the image data captured through use of the camera function of the information device 60, and easily transmit the person image data. As the required information worth the information provision in the sixth embodiment, a person image used to monitor a state in which the kindergartener who uses the kindergarten bus and the like is left in the kindergarten bus is given.

As this dedicated software, there is given software having a function capable of automatically extracting a person image for which the information provision is requested, from the person image data through use of, for example, the AI technology. The manager, the driver, or the like can use the dedicated software having this automatic extraction function to extract the person image data as the required information worth the information provision from a plurality of pieces of captured image data without being aware of whether or not the person being the photographing target is the required information worth information provision, and easily transmit the extracted information.

In other words, by using the dedicated software, quick information transmission having a suppressed transmission volume is achieved by editing the person image data obtained by narrowing down to the required information worth the information provision on the information device 50 side, and then automatically transmitting the person image data to the computer 10 side.

Moreover, also on the computer 10 side, by collecting information from the information device 60 in which the dedicated software having the above-mentioned automatic extraction function is installed, it is possible to eliminate or to suppress the processing of extracting, as the person image data, the specific person registered as the required information worth the information provision from the image data transmitted from the side of the plurality of information devices 60, and hence efficient information collection can be achieved.

As a specific example of using the dedicated software having the automatic extraction function, for example, the following examples are given.

Specific Example: Application Relating to Monitoring Boarding and Exiting State of Kindergarteners or the Like For example, there is assumed a case in which it is desired to always monitor whether or not a kindergartener left in a kindergarten bus exists in a large-scale kindergarten which operates a plurality of kindergarten buses. In this case, dedicated software for automatically extracting, as person image data relating to the specific person being the information provision content, a registered kindergartener from person image data is installed in advance in the information device 60.

As a result, the information device 60 can capture image data without being aware of whether or not a photographing target is the specific person, and can then automatically extract the person image data relating to the specific person. The information device 60 can further transmit, to the computer 10, the person location information generated for the automatically-extracted person image data.

Meanwhile, the computer 10 specifies a person who has used the specific moving vehicle based on the person location information generated by the information device 60, and can generate information provision data for specifying the person who has boarded or exited from the specific moving body and the boarding or exiting time. As a result, it is possible to easily monitor whether or not a kindergartener left in the kindergarten bus exists.

The dedicated software can have not only the automatic extraction function, but also the function of automatic transmission to the computer 10.

Moreover, in FIG. 7, there is illustrated a configuration in which the information device 60 fixedly disposed in the specific moving vehicle has the function of communicating to and from the computer 10, but the configuration in the sixth embodiment is not limited to that of FIG. 7.

For example, it is also possible to employ a configuration in which the information device 60 has a communication function such as Bluetooth (trademark) or near-field communication (NFC), and communicate to and from a mobile terminal held by the driver of the specific moving vehicle, to thereby communicate to and from the computer 10 via the mobile terminal.

As described above, according to the sixth embodiment, the information device is fixedly installed in the specific moving vehicle, and hence the GPS sensor is not required. Thus, after specifying the installation location in the specific moving vehicle as the unique position information, it is possible to monitor a location history by specializing in the user registered to use the specific moving vehicle as the specific person to be searched for. That is, also with the sixth embodiment not including the GPS sensor, it is possible to provide the position information providing system suitable to the provision of information including the position information on the photographing subject.

Further, according to the sixth embodiment, it is possible to achieve the improvement of the operability or the improvement of the efficiency of the information provision by installing the dedicated software suitable to the information provision in the information device. In particular, the position information providing system which suppresses an amount of information to be uploaded from the information device to the computer and then efficiently executes the desired information provision can be achieved by installing, in the information device, the dedicated software which is capable of extracting, as the required information worth the information provision, the user registered as the person who uses the specific moving vehicle from the image data.

The manager, the driver, or the like can use this position information providing system to easily grasp whether or not a person left in the moving vehicle exists, whether or not there is a history in which an unregistered suspicious person has boarded the moving vehicle, and the like.

In the fifth embodiment and the sixth embodiment described above, the case in which the information on the specified person is provided has been described, but the fifth embodiment and the sixth embodiment can also be applied to provision of information on a pet, a wild animal, and the like in place of the person.

Seventh Embodiment

In the above-mentioned fifth embodiment, description has been given of the case in which the person location information is generated by the information device 50 fixedly disposed in a facility. Moreover, in the above-mentioned sixth embodiment, description has been given of the case in which the person location information is generated by the information device 60 fixedly disposed in a specific moving vehicle. In contrast, in the seventh embodiment, a position information providing system formed by combining the information device 50 and the information device 60 is described.

In the seventh embodiment, a case in which the information device 50 is fixedly disposed in a specific kindergarten, each of the M information device 60(1) to 60(M) is fixedly disposed in one of the specific M kindergarten buses for going to the specific kindergarten, and the information device 50 further has the function of the computer 10 which generates the information provision data is described as a specific example.

The information devices 50 and 60 in the seventh embodiment do not require the GPS sensor as in the fifth embodiment and the sixth embodiment. Moreover, for the position information providing system according to the seventh embodiment, it is important to provide information on a time at which the specific person existed in the moving vehicle or the kindergarten, and hence the information device 50 and the information device 60 standardly have the function of the clock which provides the time information.

Figure 8:
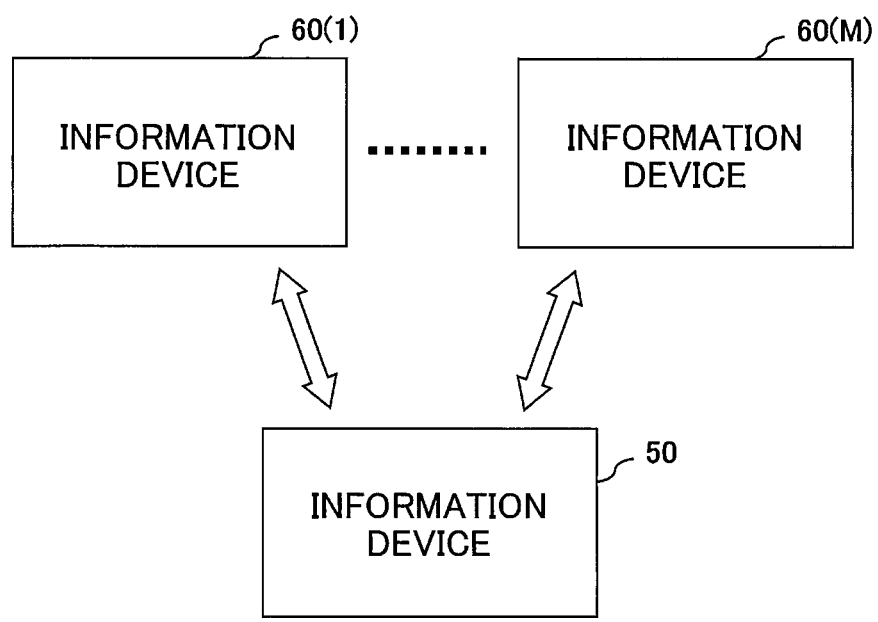
FIG. 8 is a diagram for illustrating an overall configuration of a position information providing system according to a seventh embodiment of this disclosure.

FIG. 8 is a diagram for illustrating an overall configuration of the position information providing system according to the seventh embodiment of this disclosure. The position information providing system according to the seventh embodiment is formed of one information device 50 and M information devices 60(1) to 60(M).

The information device 50 of FIG. 8 is fixedly disposed in the specific kindergarten, and as in the information device 50 of FIG. 6 in the fifth embodiment, has a function of generating the person location information through use of its own camera and clock. The information device 50 in the seventh embodiment corresponds to a first information device.

Moreover, each of the information devices 60(1) to 60(M) of FIG. 8 is fixedly disposed in one of the specific M kindergarten buses for going to the specific kindergarten, and as in the information device 60 of FIG. 7 in the sixth embodiment, has the function of generating the person location information through use of its own camera and clock. Each of the information devices 60(1) to 60(M) in the seventh embodiment corresponds to a second information device.

When each of the information device 60(1) to 60(M) has a communication function such as Bluetooth or NFC, it is also possible to employ a configuration in which each of the information device 60(1) to 60(M) communicates to and from a mobile terminal held by the driver of the kindergarten bus, to thereby communicate to and from the information device 50 via the mobile terminal.

As another example, the information device 50 and the information devices 60(1) to 60(M) may also use a Wi-Fi communication environment provided in the specific kindergarten to execute the communication.

That is, the information device 50 and the information devices 60(1) to 60(M) can employ an appropriate communication method in accordance with the application environment to suppress cost relating to a communication facility.

The number of information devices 50 is not limited to one, and may be two or more. Moreover, the number of information devices 60 is not limited to M, and is only required to be one or more.

The position information providing system according to the seventh embodiment has a technical feature in such a point that the information device 50 and the information devices 60(1) to 60(M) are combined with each other, and such a point that the information device 50 has the function of generating the information provision data. Thus, specific functions of the information device 50 and the information devices 60(1) to 60(M) in the seventh embodiment are described next.

The seventh embodiment has the following feature 10 to feature 16. The feature 10, the feature 13, and the feature 14 correspond to the feature 4, the feature 6, and the feature 5 described in the above-mentioned fifth embodiment, respectively. The feature 11, the feature 12, and the feature 15 correspond to the feature 7, the feature 9, and the feature 8 described in the above-mentioned fifth embodiment, respectively. The feature 16 is a feature unique to the seventh embodiment.

The first information device in the description given below corresponds to the information device 50 of FIG. 8. The second information device corresponds to each of the information devices 60(1) to 60(M) of FIG. 8.

Feature 10: The first information device is installed at a fixed position, and includes a first clock which provides time information and a first camera. The first information device extracts first person image data from image data acquired by the first camera, and generates first person location information that associates first position information relating to the fixed position, the first person image data, and first time information on a time of acquisition of the first person image data with one another.

Feature 11: The second information device is installed at a fixed position of a specific moving body, and includes a second clock which provides time information and a second camera. The second information device extracts, as second person image data, a person that boards or exits from the specific moving body from image data acquired by the second camera, and generates second person location information that associates second position information indicating that the person has boarded or exited from the specific moving body, the second person image data, and second time information on a time of acquisition of the second person image data with one another.

Feature 12: The second information device having the feature 11 further has installed therein second dedicated software for extracting, from a plurality of pieces of the acquired image data, as the second person image data, a specific person registered as required information worth information provision, and generates the second person location information for the second person image data extracted through use of the second dedicated software, and transmits the generated second person location information to the first information device.

Feature 13: The first information device having the feature 10 has installed therein first dedicated software for extracting, from a plurality of pieces of the acquired image data, as the first person image data, a specific person registered as required information worth information provision, and generates the first person location information for the first person image data extracted through use of the first dedicated software.

Feature 14: The first information device generates first information provision data for specifying a person that has existed at the fixed position and a time of the existence based on the first person location information.

Feature 15: The first information device generates second information provision data for specifying a person that has boarded or exited from the specific moving body and a boarding or exiting time based on the second person location information generated by the second information device.

Feature 16: The first information device summarizes person location information on the same specific person as time elapses based on the first information provision data and the second information provision data, to thereby further generate third information provision data.

A supplemental description is now mainly given of the feature 16 unique to the seventh embodiment.

In the seventh embodiment, as an example, a system capable of providing the position information on the kindergartener of the kindergarten is implemented by combining the information device 50 and the information devices 60(1) to 60(M).

That is, each of the information devices 60(1) to 60(M) fixedly disposed in the kindergarten bus and corresponding to the second information device can summarize, together with the time information, the kindergarteners who have boarded and have exited from each kindergarten bus by generating the second person location information through use of the feature 11 and the feature 12.

Meanwhile, the information device 50 fixedly disposed in the kindergarten and corresponding to the first information device can summarize, together with the time information, the kindergarteners which have entered and exited from the kindergarten by generating the first person location information through use of the feature 10 and the feature 13.

Moreover, the information device 50 can summarize the first information provision data for specifying the kindergartener who has entered and has exited from the kindergarten and the times thereof through use of the feature 14 based on the first person location information, and can summarize the second information provision data for specifying the kindergartener who has boarded and has exited from each kindergarten bus and the times thereof through use of the feature 15 based on the second person location information generated by each of the information devices 60(1) to 60(M).

Further, the information device 50 can further generate the third information provision data through use of the feature 16 by summarizing the person location information on the same kindergartener as the time elapses based on the first information provision data and the second information provision data.

Thus, it is possible to easily grasp, for each kindergartener going to the kindergarten on the kindergarten bus, the time and the place of confirmation of the existence through use of the time series data. The information device 50 usually summarizes, in a time period for going to the kindergarten in the morning, for each kindergartener:

(1) the second information provision data at the time of boarding the bus;
(2) the second information provision data at the time of exiting from the bus; and
(3) the first information provision data at the time of arrival at the kindergarten after the exit from the bus, to thereby be able to generate the third information provision data.

Moreover, the information device 50 summarizes, in a time period for leaving the kindergarten, for each kindergartener:

(4) the first information provision data at the time of heading toward the bus after exiting from the kindergarten;
(5) the second information provision data at the time of boarding the bus; and
(6) the second information provision data at the time of exiting from the bus, to thereby be able to generate the third information provision data.

Thus, a staff member of the kindergarten can quickly grasp, from the time series data in the third information provision data, the state in which the kindergartener is left in the kindergarten bus, a state in which the kindergartener has not boarded the kindergarten bus, a state in which the kindergartener does not come to the kindergarten, and the like.

Further, the information device 50 can give a notification to a parent of the kindergartner each time the third information provision data is updated as required.

In particular, the information device 50 and the information devices 60(1) to 60(M) can easily and quickly execute an operation of extracting a specific kindergartner to create the person location information by installing the dedicated software therein in advance.

Further, the information device 50 can easily and quickly execute an operation of creating the first information provision data to the third information provision data to provide the required information by installing the dedicated software therein in advance.

Moreover, the information device can also execute display, warning, notification, and the like for notifying of an abnormality, for example, when the above-mentioned flow of the items (1) to (3) cannot be confirmed in the time period for going to the kindergarten or when the above-mentioned flow of the items (4) to (6) cannot be confirmed in the time period for leaving the kindergarten based on the third information provision data.

As described above, according to the seventh embodiment, it is possible to provide the position information providing system suitable to managing the position information on the specific person as the time series to provide the information by combining the first information device fixedly disposed in the specific facility and the second information devices each fixedly disposed in the specific moving vehicle.

In the above-mentioned seventh embodiment, there has been described the case in which the information device 50 is fixedly disposed at the specific place such as the kindergarten, the M information devices 60(1) to 60(M) are fixedly disposed in the moving vehicles, and the information device 50 further has the function of the computer 10 which generates the information provision data, but the present invention is not limited to this configuration.

It is also possible to employ, for the information device 50, the same configuration as that of FIG. 6 in the fifth embodiment, and for the information device 60, the same configuration as that of FIG. 7 in the sixth embodiment, to thereby employ a configuration in which both the information device 50 and the information device 60 are connected to the computer 10 via the network 40. When this configuration is employed, the information provision data is generated by the computer 10.

Moreover, the authentication of the specific person described in the fourth embodiment to the seventh embodiment is not limited to the face authentication from the image data, and use of biometric authentication is also conceivable. In particular, as described in the sixth embodiment and the seventh embodiment, when the specific person being the target of the information provision is specified in advance such as the case of the kindergartener, in place of the face authentication, there may also be used biometric authentication which executes personal authentication through measurement of a biometric feature, such as fingerprint authentication, iris authentication, and voiceprint authentication.

Each function of the computer or the information device illustrated in each of FIG. 1 in the first embodiment to the fourth embodiment, FIG. 6 in the fifth embodiment, FIG. 7 in the sixth embodiment, and FIG. 8 in the seventh embodiment is implemented by the processing circuit. The processing circuit which implements each function may be dedicated hardware or a processor which executes a program stored in a memory.

Figure 9:
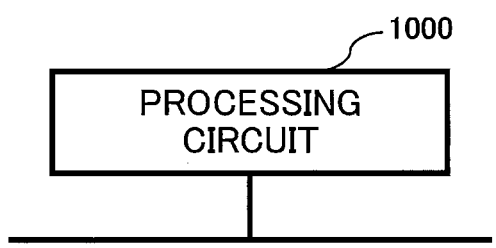
FIG. 9 is a configuration diagram for illustrating a case in which each function of a computer in the first embodiment to the seventh embodiment of this disclosure is implemented by a processing circuit, which is dedicated hardware.
Figure 10:
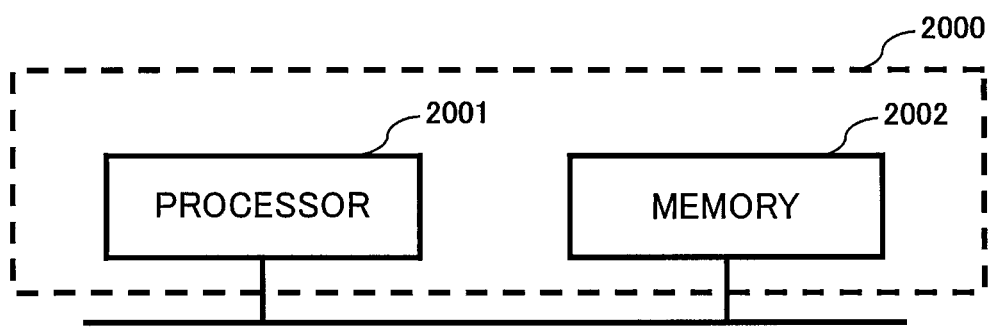
FIG. 10 is a configuration diagram for illustrating a case in which each function of the computer in the first embodiment to the seventh embodiment of this disclosure is implemented by a processing circuit including a processor and a memory.

As an example, FIG. 8 is a configuration diagram for illustrating a case in which each function of the computer 10 in the first embodiment to the sixth embodiment of this disclosure is implemented by a processing circuit 1000, which is dedicated hardware. Moreover, FIG. 9 is a configuration diagram for illustrating a case in which each function of the computer 10 in the first embodiment to the sixth embodiment of this disclosure is implemented by a processing circuit 2000 including a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof.

The functions of the data transmission and reception unit 11, the data creation unit 12, and the data extraction unit 13 may each be implemented by the individual processing circuit 1000, or may be implemented together by one processing circuit 1000.

Meanwhile, when the processing circuit is the processor 2001, the functions of the data transmission and reception unit 11, the data creation unit 12, and the data extraction unit 13 are implemented by software, firmware, or a combination of software and firmware. The software and the firmware are coded as a program and stored in the memory 2002. The processor 2001 reads out and executes the program stored in the memory 2002, to thereby implement each of the functions.

That is, the computer 10 includes the memory 2002 for storing programs the execution of which by the processing circuit 2000 ultimately leads to the execution of the functions of the data transmission and reception unit 11, the data creation unit 12, and the data extraction unit 13.

It is also understood that those programs cause a computer to execute the steps and methods described above for the respective constituent features. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisc, or a DVD.

Some of the functions of the respective constituent features described above may be implemented by dedicated hardware, and others thereof may be implemented by software or firmware.

In this manner, the processing circuit can implement the functions of the constituent features described above by hardware, software, firmware, or a combination thereof.

REFERENCE SIGNS LIST 10 computer, 11 data transmission and reception unit, 12 data creation unit, 13 data extraction unit, 14 storage unit, 20, 20(1) to 20(M) information device, 30 information request terminal, 40 network, 50, 50(1) to 50(M) information device, 60, 60(1) to 60(M) information device

The invention claimed is:

1. A position information providing system, comprising:
an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and
a computer configured to generate information provision data based on the subject location information generated by the information device,
wherein the information device is configured to generate, through installation of dedicated software for extracting, from one or a plurality of pieces of the acquired image data, image data including the subject identification information as required information worth information provision, the subject location information for image data extracted through use of the dedicated software from image data captured before notification of the information provision and after the notification of the information provision, and to transmit the generated subject location information to the computer, wherein the image data acquired by the camera included in the information device includes image data already captured through use of the camera before the notification of the information provision and captured through use of the camera after the notification of the information provision, without an information provider that operates the information device being aware of whether a photographing target is the required information worth information provision, and wherein the information device is configured to apply character recognition processing to the image data extracted through use of the dedicated software to extract character information included in the image data, and to generate the subject location information specified from the extracted character information.

2. The position information providing system according to claim 1, wherein the subject identification information is character information that is described on a nameplate attached to a product already existing in a market and that is sued to identify the product, and wherein the dedicated software is configured to extract image data including the subject identification information as the required information worth the information provision from the image data including the nameplate.

3. The position information providing system according to claim 1, wherein the dedicated software has a function of automatically transmitting the generated subject location information to the computer.

4. A position information providing system, comprising:

an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and a computer configured to generate information provision data based on the subject location information generated by the information device, wherein the information device is configured to generate, through installation of dedicated software for extracting, from one or a plurality of pieces of the acquired image data, image data including the subject identification information as required information worth information provision, the subject location information for image data extracted through use of the dedicated software from image data captured before notification of the information provision and after the notification of the information provision, and to transmit the generated subject location information to the computer, wherein the information device further includes a clock configured to provide time information, wherein the image data acquired by the camera included in the information device includes image data already captured through use of the camera before the notification of the information provision and captured through use of the camera after the notification of the information provision, without an information provider that operates the information device being aware of whether a photographing target is the required information worth information provision, and wherein the information device is configured to generate the subject location information within a certain determined period in response to an information provision request from a service user based on one or a plurality of pieces of the image data acquired by the camera and including the time information.

5. The position information providing system according to claim 4, wherein the subject identification information is character information that is described on a nameplate attached to a product already existing in a market and that is sued to identify the product, and wherein the dedicated software is configured to extract image data including the subject identification information as the required information worth the information provision from the image data including the nameplate.

6. The position information providing system according to claim 4, wherein the dedicated software has a function of automatically transmitting the generated subject location information to the computer.

7. A position information providing system, comprising:

an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and a computer configured to generate information provision data based on the subject location information generated by the information device, wherein the information device is configured to generate, through installation of dedicated software for extracting, from one or a plurality of pieces of the acquired image data, image data including the subject identification information as required information worth information provision, the subject location information for image data extracted through use of the dedicated software from image data captured before notification of the information provision and after the notification of the information provision, and to transmit the generated subject location information to the computer, wherein the image data acquired by the camera included in the information device includes image data already captured through use of the camera before the notification of the information provision, and captured through use of the camera after the notification of the information provision, without an information provider that operates the information device being aware of whether a photographing target is the required information worth information provision, and wherein the dedicated software has a function of automatically extracting, through use of an AI technology, the required information worth the information provision from the image data.

8. The position information providing system according to claim 7, wherein the subject identification information is character information that is described on a nameplate attached to a product already existing in a market and that is sued to identify the product, and wherein the dedicated software is configured to extract image data including the subject identification information as the required information worth the information provision from the image data including the nameplate.

9. The position information providing system according to claim 7, wherein the dedicated software has a function of automatically transmitting the generated subject location information to the computer.

10. A position information providing system, comprising:
an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and
a computer configured to generate information provision data based on the subject location information generated by the information device,
wherein the information device is configured to generate, through installation of dedicated software for extracting, from one or a plurality of pieces of the acquired image data, image data including the subject identification information as required information worth information provision, the subject location information for image data extracted through use of the dedicated software from image data captured before notification of the information provision and after the notification of the information provision, and to transmit the generated subject location information to the computer,
wherein the subject identification information is character information that is described on a nameplate attached to a product already existing in a market and that is sued to identify the product, and
wherein the dedicated software is configured to extract image data including the subject identification information as the required information worth the information provision from the image data including the nameplate.

11. A position information providing system, comprising:
an information device which includes a GPS sensor and a camera, the information device being configured to extract image data including subject identification information for identifying a photographing subject from image data acquired by the camera, and to generate subject location information that associates position information acquired by the GPS sensor and the subject identification information with each other; and
a computer configured to generate information provision data based on the subject location information generated by the information device,
wherein the information device is configured to generate, through installation of dedicated software for extracting, from one or a plurality of pieces of the acquired image data, image data including the subject identification information as required information worth information provision, the subject location information for image data extracted through use of the dedicated software from image data captured before notification of the information provision and after the notification of the information provision, and to transmit the generated subject location information to the computer,
wherein the dedicated software has a function of automatically transmitting the generated subject location information to the computer.

12. A position information providing system, comprising:
an information device which is installed at a fixed position for each facility, and which includes a clock configured to provide time information and a camera, the information device being configured to extract person image data from image data acquired by the camera, and to generate person location information that associates, for the each facility, position information relating to the fixed position, the person image data, and time information on a time of acquisition of the person image data with one another; and
a computer configured to generate information provision data for specifying a person that has existed at the fixed position and a time of the existence based on the person location information generated by the information device,
wherein the information device has installed therein dedicated software for extracting, from one or a plurality of pieces of the acquired image data, a specific person registered through notification as required information worth information provision as the person image data indicating that the specific person has visited a facility at which the camera is installed, or has passed through the facility at which the camera is installed, and is configured to generate the person location information for the person image data extracted through use of the dedicated software, and to transmit the generated person location information to the computer, and
wherein the computer is configured to:
provide information on a location of the specific person and the time of existence through use of the information provision data generated for the person image data automatically extracted by the information device for the specific person through use of the dedicated software from the image data acquired by the camera after the notification; and
provide information on an activity pattern of the specific person through use of the information provision data generated for the person image data automatically extracted by the information device for the specific person through use of the dedicated software from past image data acquired by the camera before the notification.

13. A position information providing system, comprising:
an information device which is installed at a fixed position of a specific moving body, and which includes a clock configured to provide time information and a camera, the information device being configured to extract, as person image data, a person that boards or exits from the specific moving body from image data acquired by the camera, and to generate person location information that associates position information indicating that the person has boarded or exited from the specific moving body, the person image data, and time information on a time of acquisition of the person image data with one another; and
a computer configured to generate information provision data for specifying a person that has boarded or exited from the specific moving body and a boarding or exiting time based on the person location information generated by the information device,
wherein the information device has installed therein dedicated software for extracting, from one or a plurality of pieces of the acquired image data, as the person image data, a specific person registered as required information worth information provision, and is configured to generate the person location information for the person image data extracted through use of the dedicated software, and to transmit the generated person location information to the computer,
wherein the computer is configured to generate the information provision data to specify a time of use of the specific moving body by the specific person and provide information on the time of use without providing information on position information on the moving body, and wherein the computer is configured to generate, as the information provision data, first information which enables identifying whether a left person exists in the specific moving body and second information which enables identifying whether a history of boarding of an unregistered person on the specific moving body exists.

14. A position information providing system, comprising:

a first information device which is installed at a fixed position of a facility, and which includes a first clock configured to provide time information and a first camera, the first information device being configured to extract first person image data from image data acquired by the first camera, and to generate first person location information that associates first position information relating to the fixed position, the first person image data, and first time information on a time of acquisition of the first person image data with one another; and a second information device which is installed at a fixed position of a specific moving body, and which includes a second clock configured to provide time information and a second camera, the second information device being configured to extract, as second person image data, a person that boards or exits from the specific moving body from image data acquired by the second camera, and to generate second person location information that associates second position information indicating that the person has boarded or exited from the specific moving body, the second person image data, and second time information on a time of acquisition of the second person image data with one another, wherein the second information device has installed therein second dedicated software for extracting, from one or a plurality of pieces of the acquired image data, as the second person image data, a specific person registered as required information worth information provision, and is configured to generate the second person location information for the second person image data extracted through use of the second dedicated software, and to transmit the generated second person location information to the first information device, and wherein the first information device has installed therein first dedicated software for extracting, from one or a plurality of pieces of the acquired image data, as the first person image data, a specific person registered as required information worth information provision, and is configured to:

generate the first person location information for the first person image data extracted through use of the first dedicated software;

generate first information provision data for specifying a person that has existed at the fixed position and a time of the existence based on the first person location information, and generate second information provision data for specifying a person that has boarded or exited from the specific moving body and a boarding or exiting time based on the second person location information generated by the second information device; and summarize person location information on the same specific person as time elapses based on the first information provision data and the second information provision data, and further generate, as third information provision data first information which enables identifying whether a left person exists in the specific moving body and second information which enables identifying whether a history of boarding of an unregistered person on the specific moving body exists.

* * * * *